US012774031B2

(12) United States Patent
Wires et al.

(10) Patent No.: US 12,774,031 B2

(45) Date of Patent: Oct. 27, 2026

(54) LAND VEHICLES INCORPORATING FRONT AND REAR POWERTRAIN UNITS, POWERTRAIN UNITS, AND COMPONENTS THEREFOR

(71) Applicant: Workhorse Group Inc., Sharonville, OH (US)

(72) Inventors: Donald L. Wires, Loveland, OH (US); Max Lupfer, Sharonville, OH (US); Ryan Doll, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 19/384,529

(22) Filed: Nov. 10, 2025

(65) Prior Publication Data

US 2026/0249914 A1 Aug. 27, 2026

Related U.S. Application Data

(63) Continuation of application No. 19/065,997, filed on Feb. 27, 2025, now Pat. No. 12,466,485.

(51) Int. Cl.

*B62D 21/11* (2006.01)
*B60K 7/00* (2006.01)
*B62D 21/02* (2006.01)

(52) U.S. Cl.

CPC ............ *B62D 21/11* (2013.01); *B60K 7/0007* (2013.01); *B62D 21/02* (2013.01); *B60K 2007/0038* (2013.01)

(58) Field of Classification Search

CPC ...... B62D 21/11; B62D 21/02; B60K 7/0007; B60K 2007/0038

See application file for complete search history.

(56) References Cited

U.S. PATENT DOCUMENTS

| | | | |
|---|---|---|---|
| 1,251,749 | A | 1/1918 | Cilley |
| 1,728,889 | A | 9/1929 | Kemble |

(Continued)

FOREIGN PATENT DOCUMENTS

| | | | |
|---|---|---|---|
| CN | 103359174 | A | 10/2013 |
| CN | 109515094 | A | 3/2019 |

(Continued)

OTHER PUBLICATIONS

International Search Report; International Searching Authority; International Patent Application No. PCT/US2025/058415; Feb. 13, 2026; 3 pages.

(Continued)

*Primary Examiner* — Erez Gurari

(74) *Attorney, Agent, or Firm* — Taft Stettinius & Hollister LLP

(57) ABSTRACT

Land vehicles are disclosed. A land vehicle includes a chassis, a plurality of wheels, a first powertrain unit, and a second powertrain unit. The chassis includes a front suspension subframe assembly and a rear suspension subframe assembly spaced from the front suspension subframe assembly in a longitudinal direction. The plurality of wheels includes a pair of front wheels supported by the front suspension subframe assembly and a pair of rear wheels supported by the rear suspension subframe assembly. The first powertrain unit is supported by the front suspension subframe assembly and coupled to the pair of front wheels. The second powertrain unit is supported by the rear suspension subframe assembly and coupled to the pair of rear wheels.

10 Claims, 18 Drawing Sheets

(56) References Cited

U.S. PATENT DOCUMENTS

| | | | | |
|---|---|---|---|---|
| 2,172,831 | A | 9/1939 | Philip | |
| 2,728,420 | A | 12/1955 | Wright et al. | |
| 2,973,220 | A | 2/1961 | White | |
| 3,066,621 | A | 12/1962 | Dean et al. | |
| 3,696,732 | A | 10/1972 | Rodgers | |
| 4,159,832 | A | 7/1979 | Inbody | |
| 4,270,622 | A | 6/1981 | Travis | |
| 4,676,545 | A | 6/1987 | Bonfilio et al. | |
| 4,934,733 | A * | 6/1990 | Smith | B60G 3/207 280/124.132 |
| 5,168,963 | A | 12/1992 | Poncini | |
| 5,363,939 | A * | 11/1994 | Catlin | B60K 5/04 180/297 |
| 5,363,969 | A | 11/1994 | Shen | |
| 5,628,438 | A | 5/1997 | Legrow | |
| 5,690,378 | A | 11/1997 | Romesburg | |
| 5,823,599 | A | 10/1998 | Gray | |
| 5,829,542 | A | 11/1998 | Lutz | |
| 6,015,198 | A | 1/2000 | Stair | |
| 6,357,769 | B1 | 3/2002 | Omundson et al. | |
| 6,893,046 | B2 | 5/2005 | Ledesma et al. | |
| 6,926,351 | B2 | 8/2005 | Telehowski et al. | |
| 6,954,152 | B1 | 10/2005 | Matthews | |
| 7,441,809 | B1 | 10/2008 | Coombs et al. | |
| 7,651,153 | B2 | 1/2010 | Martin et al. | |
| 8,002,063 | B2 | 8/2011 | Rydberg et al. | |
| 8,517,140 | B2 | 8/2013 | West et al. | |
| 8,641,133 | B1 | 2/2014 | Scaringe et al. | |
| 8,651,292 | B2 | 2/2014 | Sunderland et al. | |
| 8,714,592 | B1 | 5/2014 | Thoreson et al. | |
| 9,103,535 | B1 | 8/2015 | Strobel et al. | |
| 9,168,818 | B2 | 10/2015 | Hirai et al. | |
| 9,387,751 | B2 | 7/2016 | Kashiwai et al. | |
| 9,550,414 | B2 | 1/2017 | Kudo et al. | |
| 10,160,301 | B2 | 12/2018 | Perlo et al. | |
| 10,239,558 | B2 | 3/2019 | Okumoto | |
| 10,435,075 | B2 | 10/2019 | Lorenz et al. | |
| 10,457,330 | B2 | 10/2019 | Perlo et al. | |
| 10,518,627 | B2 | 12/2019 | Nagpal et al. | |
| 10,690,234 | B1 | 6/2020 | Oury, Jr. et al. | |
| 10,737,737 | B2 | 8/2020 | Birnschein et al. | |
| 10,801,169 | B2 | 10/2020 | Roy et al. | |
| 10,967,904 | B2 | 4/2021 | Penz et al. | |
| 11,220,297 | B2 | 1/2022 | Willison | |
| 11,279,217 | B2 | 3/2022 | Kraft et al. | |
| 11,383,569 | B2 | 7/2022 | Stangl | |
| 11,479,301 | B2 * | 10/2022 | Wires | B62D 23/00 |
| 11,548,555 | B2 | 1/2023 | Swain | |
| 11,691,673 | B1 | 7/2023 | Zhao et al. | |
| 11,702,162 | B2 | 7/2023 | Harmon et al. | |
| 11,766,925 | B2 | 9/2023 | Landvik et al. | |
| 11,801,741 | B2 | 10/2023 | Zandbergen et al. | |
| 11,865,923 | B2 | 1/2024 | Premkumar et al. | |
| 12,168,489 | B2 | 12/2024 | Choi | |
| 12,466,485 | B1 | 11/2025 | Wires et al. | |
| 12,472,807 | B1 * | 11/2025 | Wires | B60K 1/04 |
| 12,473,029 | B1 * | 11/2025 | Wires | B60K 1/02 |
| 12,473,030 | B1 * | 11/2025 | Wires | B60K 1/00 |
| 2002/0113394 | A1 | 8/2002 | Ziech et al. | |
| 2004/0046381 | A1 | 3/2004 | Yoshida et al. | |
| 2004/0118643 | A1 | 6/2004 | Booher | |
| 2006/0158024 | A1 | 7/2006 | Wendl | |
| 2006/0273571 | A1 | 12/2006 | Matsumoto et al. | |
| 2007/0257570 | A1 | 11/2007 | Walter et al. | |
| 2008/0003321 | A1 | 1/2008 | Kerr et al. | |
| 2008/0078603 | A1 * | 4/2008 | Taji | H02K 5/00 180/312 |
| 2009/0032321 | A1 | 2/2009 | Marsh et al. | |
| 2010/0025132 | A1 | 2/2010 | Hill et al. | |
| 2010/0072787 | A1 | 3/2010 | Abe et al. | |
| 2010/0101900 | A1 | 4/2010 | Usui | |
| 2010/0108417 | A1 | 5/2010 | Gilmore | |
| 2010/0230192 | A1 | 9/2010 | Riley | |
| 2010/0263954 | A1 | 10/2010 | Constans | |
| 2011/0017527 | A1 * | 1/2011 | Oriet | B60S 13/00 296/186.4 |
| 2012/0103713 | A1 | 5/2012 | Ohashi | |
| 2013/0153343 | A1 | 6/2013 | Neudeck | |
| 2013/0181485 | A1 | 7/2013 | Rumpel | |
| 2013/0241237 | A1 | 9/2013 | Dziuba et al. | |
| 2013/0341971 | A1 | 12/2013 | Masini et al. | |
| 2014/0054916 | A1 | 2/2014 | Knudtson et al. | |
| 2014/0083606 | A1 | 3/2014 | Masini et al. | |
| 2014/0159468 | A1 | 6/2014 | Heinen et al. | |
| 2014/0182954 | A1 | 7/2014 | Weber | |
| 2014/0203624 | A1 | 7/2014 | Hilton et al. | |
| 2015/0027795 | A1 | 1/2015 | Hirai et al. | |
| 2015/0068832 | A1 | 3/2015 | Rumpel et al. | |
| 2015/0291017 | A1 | 10/2015 | LaBiche | |
| 2015/0367721 | A1 | 12/2015 | Shiraki et al. | |
| 2016/0106073 | A1 | 4/2016 | Van der Linde | |
| 2016/0129958 | A1 | 5/2016 | Byrnes et al. | |
| 2017/0050514 | A1 | 2/2017 | Li | |
| 2017/0113716 | A1 | 4/2017 | Gong et al. | |
| 2017/0225715 | A1 | 8/2017 | Kobayashi et al. | |
| 2017/0305253 | A1 | 10/2017 | Perle et al. | |
| 2018/0037151 | A1 | 2/2018 | Bauer et al. | |
| 2018/0043895 | A1 | 2/2018 | Shami et al. | |
| 2018/0108891 | A1 | 4/2018 | Fees et al. | |
| 2018/0237076 | A1 | 8/2018 | Perlo et al. | |
| 2018/0290627 | A1 | 10/2018 | Hariri et al. | |
| 2018/0337377 | A1 | 11/2018 | Stephens et al. | |
| 2018/0345777 | A1 | 12/2018 | Bimschein et al. | |
| 2019/0054895 | A1 | 2/2019 | Hall et al. | |
| 2019/0056005 | A1 | 2/2019 | Hall et al. | |
| 2019/0168678 | A1 | 6/2019 | Magnuson et al. | |
| 2019/0217764 | A1 | 7/2019 | Conny | |
| 2019/0366834 | A1 * | 12/2019 | Nagpal | B60K 17/165 |
| 2019/0389444 | A1 | 12/2019 | Kistner et al. | |
| 2020/0062183 | A1 | 2/2020 | Smith et al. | |
| 2020/0331533 | A1 | 10/2020 | Jin | |
| 2020/0361536 | A1 * | 11/2020 | Swain | B60G 11/02 |
| 2020/0369140 | A1 | 11/2020 | McCarron et al. | |
| 2020/0369334 | A1 | 11/2020 | Lee | |
| 2020/0384806 | A1 * | 12/2020 | Falls | B60K 17/16 |
| 2021/0086600 | A1 * | 3/2021 | Brock | B60K 5/12 |
| 2021/0101641 | A1 | 4/2021 | Kim et al. | |
| 2021/0138887 | A1 | 5/2021 | Shih et al. | |
| 2021/0171120 | A1 | 6/2021 | Kim et al. | |
| 2021/0206432 | A1 | 7/2021 | Willison | |
| 2022/0041244 | A1 | 2/2022 | Upadhyay et al. | |
| 2022/0097770 | A1 * | 3/2022 | Renn | B60R 19/24 |
| 2022/0123397 | A1 | 4/2022 | Weicker et al. | |
| 2022/0410692 | A1 | 12/2022 | Premkumar et al. | |
| 2023/0062143 | A1 | 3/2023 | Zandbergen et al. | |
| 2023/0070279 | A1 | 3/2023 | Wheeler et al. | |
| 2023/0130254 | A1 | 4/2023 | Gonzalez et al. | |
| 2023/0303178 | A1 | 9/2023 | Testa | |
| 2024/0001748 | A1 | 1/2024 | Vreede | |
| 2024/0034137 | A1 | 2/2024 | Weber et al. | |
| 2024/0278843 | A1 | 8/2024 | Nagasawa | |
| 2024/0351399 | A1 | 10/2024 | Favaretto et al. | |
| 2025/0083760 | A1 | 3/2025 | Schollenberger | |
| 2025/0242677 | A1 * | 7/2025 | Tokarz | B60K 1/04 |

FOREIGN PATENT DOCUMENTS

| | | | |
|---|---|---|---|
| CN | 110884568 | A | 3/2020 |
| DE | 19626901 | A1 | 1/1998 |
| DE | 102012101483 | A1 | 6/2013 |
| DE | 102015200737 | B4 | 6/2020 |
| DE | 102019109465 | A1 | 10/2020 |
| EP | 1538072 | A1 | 6/2005 |
| EP | 2552763 | A2 | 2/2013 |
| EP | 3174680 | A2 | 6/2017 |
| EP | 3689717 | A1 | 8/2020 |
| FR | 2698601 | A1 | 6/1994 |

(56) References Cited

FOREIGN PATENT DOCUMENTS

| | | | |
|---|---|---|---|
| GB | 2479898 | A | 11/2011 |
| WO | 2016016662 | A2 | 2/2016 |

OTHER PUBLICATIONS

Written Opinion of the International Searching Authority; International Searching Authority; International Patent Application No. PCT/US2025/058415; Feb. 13, 2026; 13 pages.

Invitation to Pay Additional Fees; International Searching Authority; International Patent Application No. PCT/US2025/058409; Feb. 19, 2026; 2 pages.

International Search Report; International Searching Authority; International Patent Application No. PCT/US2025/058409; Apr. 15, 2026; 4 pages.

Written Opinion of the International Searching Authority; International Searching Authority; International Patent Application No. PCT/US2025/058409; Apr. 15, 2026; 15 pages.

International Search Report; International Searching Authority; International Patent Application No. PCT/US2021/012327; Mar. 9, 2021; 2 pages.

Written Opinion of the International Searching Authority; International Searching Authority; International Patent Application No. PCT/US2021/012327; Mar. 9, 2021; 8 pages.

International Search Report; International Searching Authority; International Patent Application No. PCT/US2021/012330; Mar. 9, 2021; 2 pages.

Written Opinion of the International Searching Authority; International Searching Authority; International Patent Application No. PCT/US2021/012330; Mar. 9, 2021; 9 pages.

International Search Report; International Searching Authority; International Patent Application No. PCT/US2021/012332; Mar. 24, 2021; 2 pages.

Written Opinion of the International Searching Authority; International Searching Authority; International Patent Application No. PCT/US2021/012332; Mar. 24, 2021; 7 pages.

Supplementary European Search Report; European Patent Office; European Application No. 21710384.5; Oct. 21, 2021; 12 pages.

International Search Report; International Searching Authority; International Patent Application No. PCT/US2022/014847; Mar. 8, 2022; 3 pages.

Written Opinion of the International Searching Authority; International Searching Authority; International Patent Application No. PCT/US2022/014847; Mar. 8, 2022; 6 pages.

International Search Report; International Searching Authority; International Patent Application No. PCT/US2022/014844; Mar. 16, 2022; 2 pages.

Written Opinion of the International Searching Authority; International Searching Authority; International Patent Application No. PCT/US2022/014844; Mar. 16, 2022; 7 pages.

International Search Report; International Searching Authority; International Patent Application No. PCT/US2022/014851; Apr. 25, 2022; 2 pages.

Written Opinion of the International Searching Authority; International Searching Authority; International Patent Application No. PCT/US2022/014851; Apr. 25, 2022; 7 pages.

International Search Report; International Searching Authority; International Patent Application No. PCT/US2022/014852; Apr. 18, 2022; 2 pages.

Written Opinion of the International Searching Authority; International Searching Authority; International Patent Application No. PCT/US2022/014852; Apr. 18, 2022; 7 pages.

Extended European Search Report; European Patent Office; European Patent Application No. 22153661.8; Jul. 6, 2022; 11 pages.

Partial European Search Report (R. 64 EPC); European Patent Office; European Patent Application No. 22153665.9; Aug. 18, 2022; 16 pages.

International Search Report; International Searching Authority; International Patent Application No. PCT/US2025/058408; Apr. 10, 2026; 3 pages.

Written Opinion of the International Searching Authority; International Searching Authority; International Patent Application No. PCT/US2025/058408; Apr. 10, 2026; 16 pages.

International Search Report; International Searching Authority; International Patent Application No. PCT/US2025/058420; Feb. 26, 2026; 2 pages.

Written Opinion of the International Searching Authority; International Searching Authority; International Patent Application No. PCT/US2025/058420; Feb. 26, 2026; 8 pages.

* cited by examiner

LAND VEHICLES INCORPORATING FRONT AND REAR POWERTRAIN UNITS, POWERTRAIN UNITS, AND COMPONENTS THEREFOR

CROSS-REFERENCE TO RELATED APPLICATIONS

This application is a continuation of, and claims priority to, U.S. application Ser. No. 19/065,997, which was filed on Feb. 27, 2025. The contents of that application are incorporated herein by reference in their entirety.

TECHNICAL FIELD

The present disclosure generally relates to land vehicles adapted for use in delivery applications, and, more particularly, to electric delivery and utility vehicles.

BACKGROUND

Land vehicles adapted for use in delivery applications may have various shortcomings. In particular, electrically-powered delivery and utility vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a chassis, a plurality of wheels, a first powertrain unit, and a second powertrain unit. The chassis may include a front suspension subframe assembly and a rear suspension subframe assembly spaced from the front suspension subframe assembly in a longitudinal direction. The plurality of wheels may include a pair of front wheels supported by the front suspension subframe assembly and a pair of rear wheels supported by the rear suspension subframe assembly. The first powertrain unit may be supported by the front suspension subframe assembly and coupled to the pair of front wheels. The second powertrain unit may be supported by the rear suspension subframe assembly and coupled to the pair of rear wheels. The first powertrain unit may extend in a lateral direction perpendicular to the longitudinal direction through opposite sides of a cage of the front suspension subframe assembly such that the first powertrain unit is at least partially surrounded by the front suspension subframe assembly at the opposite sides of the cage. The second powertrain unit may be arranged beneath opposite sides of the rear suspension subframe assembly in a vertical direction without being surrounded by the opposite sides of the rear suspension subframe assembly.

In some embodiments, the front suspension subframe assembly may include a base rail assembly having a pair of base rails spaced from one another in the lateral direction and at least one cross rail extending in the lateral direction to couple the pair of base rails to one another, and the cage may be mounted to the base rail assembly.

In some embodiments, one side of the cage may be directly coupled to a first mount plate having a first cavity extending therethrough, another side of the cage may be directly coupled to a second mount plate having a second cavity extending therethrough, and the first powertrain unit may extend through the first cavity and the second cavity such that the first powertrain unit is at least partially surrounded by the first mount plate and the second mount plate.

In some embodiments, the first powertrain unit may be arranged at least partially above the pair of base rails in the vertical direction.

In some embodiments, the first powertrain unit may include a first pair of drive units, and the second powertrain unit may include a second pair of drive units.

In some embodiments, each of the first pair of drive units may be an electric motor, and each of the second pair of drive units may be an electric motor.

In some embodiments, one of the first pair of drive units may be coupled to one axle of the first powertrain unit, the other of the first pair of drive units may be coupled to another axle of the first powertrain unit, and the first pair of drive units, the one axle, and the another axle may be supported by the front suspension subframe assembly such that the first pair of drive units, the one axle, and the another axle are aligned along a first lateral axis.

In some embodiments, one of the second pair of drive units may be coupled to one axle of the second powertrain unit, the other of the second pair of drive units may be coupled to another axle of the second powertrain unit, and the one axle and the another axle may be supported by the rear suspension subframe assembly such that the one axle and the another axle are aligned along a second lateral axis.

In some embodiments, the rear suspension subframe assembly may include a base plate, a first frame arch coupled to the base plate at one lateral end thereof, and a second frame arch coupled to the base plate at another lateral end thereof opposite the one lateral end, and the second powertrain unit may be at least partially positioned in a central cavity formed in the base plate.

In some embodiments, the first frame arch may at least partially define one side of the rear suspension subframe assembly and the second frame arch may at least partially define another side of the rear suspension subframe assembly opposite the one side.

In some embodiments, the second powertrain unit may be at least partially arranged beneath the first frame arch and the second frame arch in the vertical direction without being surrounded by the first frame arch and the second frame arch.

According to another aspect of the present disclosure, a land vehicle may include a chassis, a plurality of wheels, and a powertrain unit. The chassis may include a front suspension subframe assembly. The plurality of wheels may include a pair of front wheels supported by the front suspension subframe assembly. The powertrain unit may be supported by the front suspension subframe assembly and coupled to the pair of front wheels. The powertrain unit may extend in a lateral direction through opposite sides of a cage of the front suspension subframe assembly such that the powertrain unit is at least partially surrounded by the front suspension subframe assembly at the opposite sides of the cage.

In some embodiments, the front suspension subframe assembly may include a base rail assembly having a pair of base rails spaced from one another in the lateral direction and at least one cross rail extending in the lateral direction to couple the pair of base rails to one another, and the cage may be mounted to the base rail assembly.

In some embodiments, one side of the cage may be directly coupled to a first mount plate having a first cavity extending therethrough, another side of the cage may be directly coupled to a second mount plate having a second cavity extending therethrough, and the powertrain unit may extend through the first cavity and the second cavity such that the powertrain unit is at least partially surrounded by the first mount plate and the second mount plate.

In some embodiments, the powertrain unit may be arranged at least partially above the pair of base rails in the vertical direction.

In some embodiments, the powertrain unit may include a pair of drive units, and each of the pair of drive units may be an electric motor.

In some embodiments, one of the pair of drive units may be coupled to one axle of the powertrain unit, the other of the pair of drive units may be coupled to another axle of the powertrain unit, the pair of drive units, the one axle, and the another axle may be supported by the front suspension subframe assembly such that the pair of drive units, the one axle, and the another axle are aligned along a lateral axis, and the one axle and the another axle may each be at least partially surrounded by a corresponding mount plate of a plurality of mount plates directly coupled to the opposite sides of the cage.

According to yet another aspect of the present disclosure, a land vehicle may include a chassis, a plurality of wheels, and a powertrain unit. The chassis may include a rear suspension subframe assembly. The plurality of wheels may include a pair of rear wheels supported by the rear suspension subframe assembly. The powertrain unit may be supported by the rear suspension subframe assembly and coupled to the pair of rear wheels. The powertrain unit may be arranged beneath opposite sides of the rear suspension subframe assembly in a vertical direction without being surrounded by the opposite sides of the rear suspension subframe assembly.

In some embodiments, the rear suspension subframe assembly may include a base plate, a first frame arch coupled to the base plate at one lateral end thereof, and a second frame arch coupled to the base plate at another lateral end thereof opposite the one lateral end, the powertrain unit may be at least partially positioned in a central cavity formed in the base plate, and the first frame arch may at least partially define one side of the rear suspension subframe assembly and the second frame arch may at least partially define another side of the rear suspension subframe assembly opposite the one side.

In some embodiments, the powertrain unit may be at least partially arranged beneath the first frame arch and the second frame arch in the vertical direction without being surrounded by the first frame arch and the second frame arch.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF ILLUSTRATIVE EMBODIMENTS

Figure 1:
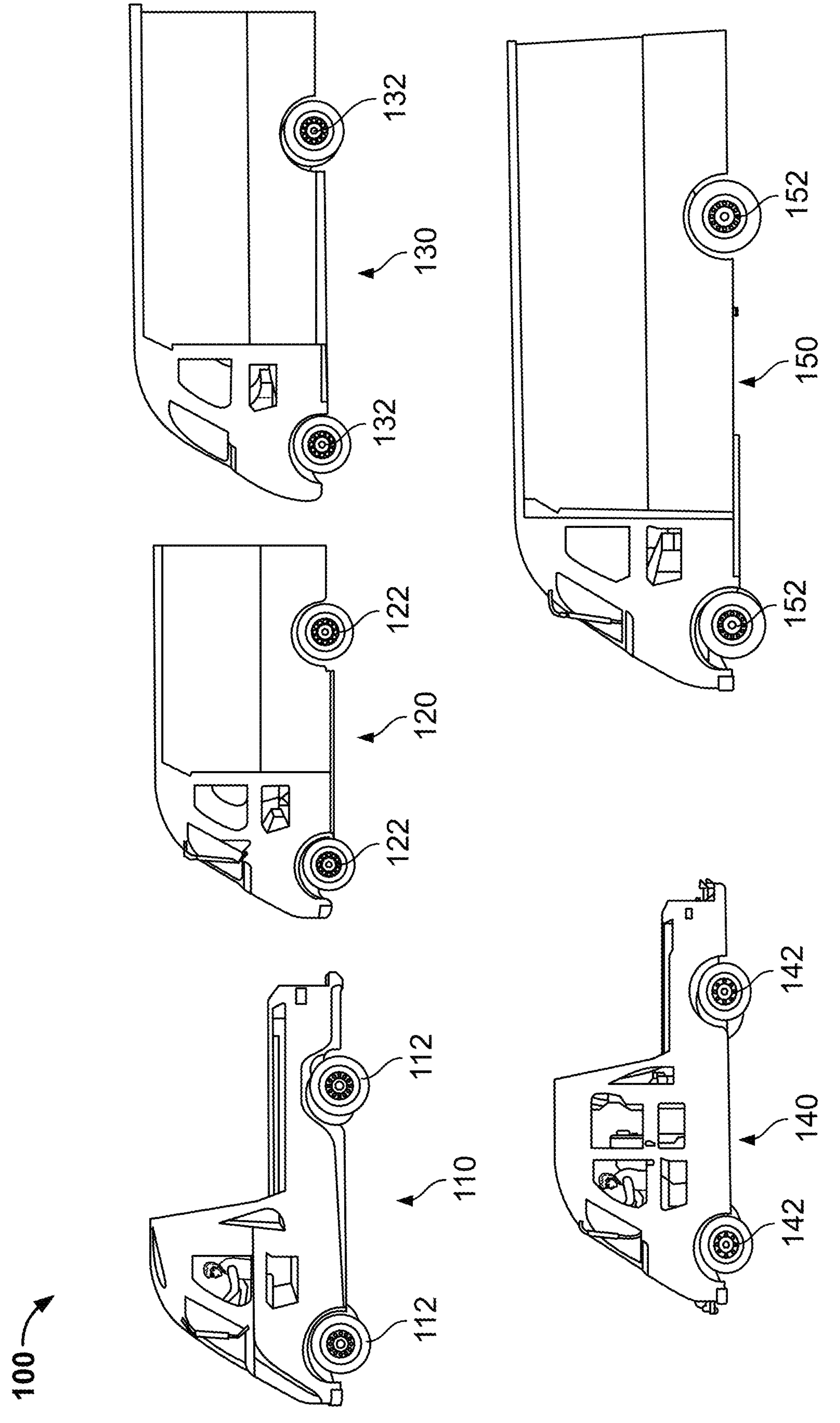
FIG. 1 depicts side elevation views of a number of electric vehicles that may incorporate suspension assemblies according to certain embodiments of the disclosure.
Figure 2:
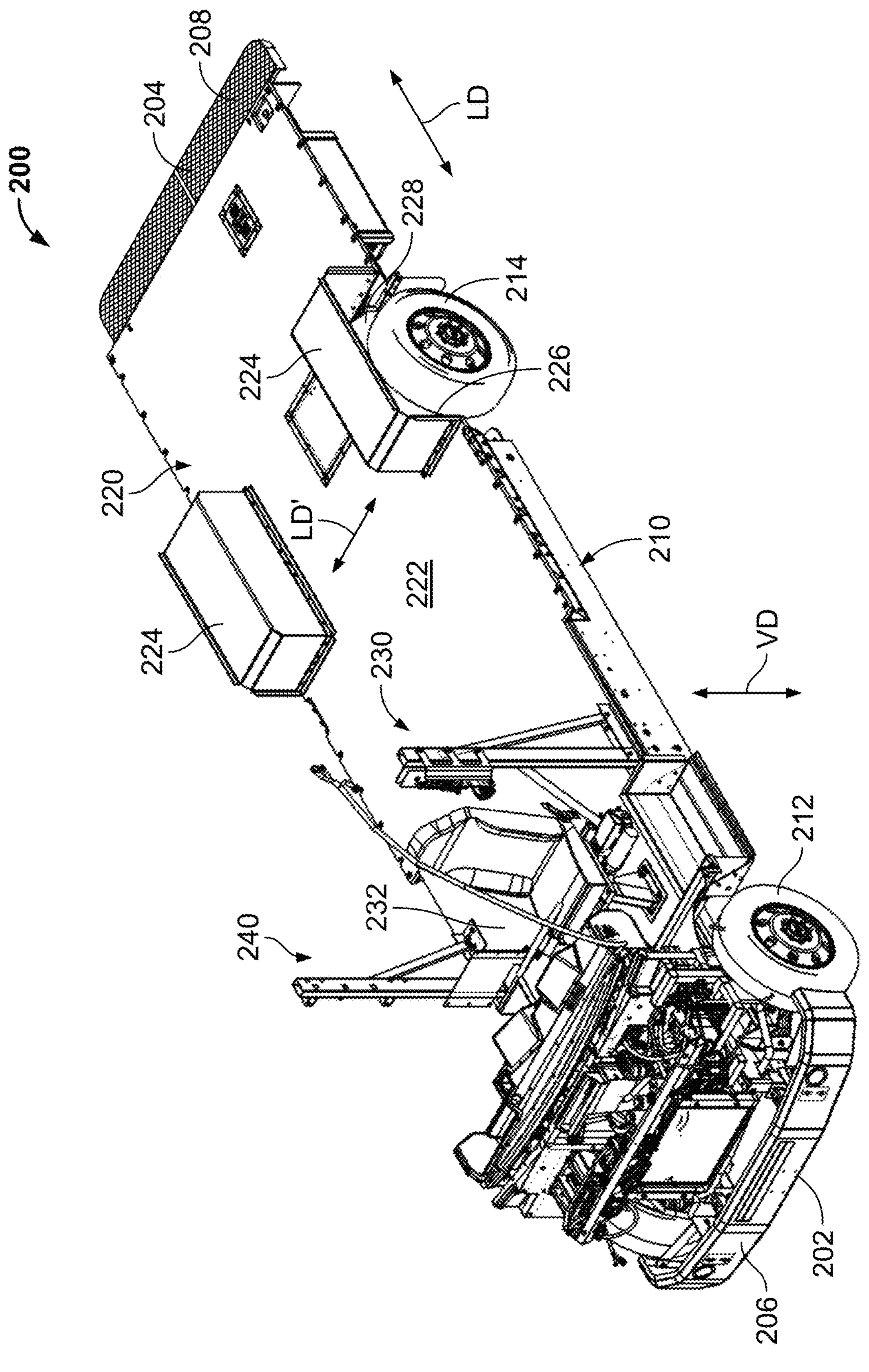
FIG. 2 is a perspective view of a vehicle chassis at least partially obscured by a vehicle floor and adapted for inclusion in one or more of the electric vehicles of FIG. 1 according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110 having wheels 112, a 650 cubic foot capacity delivery vehicle 120 having wheels 122, a 1000 cubic foot capacity delivery vehicle 130 having wheels 132, a six-passenger flatbed utility vehicle 140 having wheels 142, and a 1200 cubic foot capacity delivery vehicle 150 having wheels 152. In some embodiments, the land vehicle line 100 may be similar to the vehicle line 100 discussed in U.S. Pat. No. 11,400,982, which issued on Aug. 2, 2022, and which is incorporated by reference herein in its entirety. However, in some embodiments, the land vehicle line 100 may include any vehicle having a capacity within a particular range, such as a range of from 400 cubic feet to 1400 cubic feet, for example. Additionally, in some embodiments, the land vehicle line 100 may include a vehicle similar to the vehicle 100 discussed in U.S. Pat. No. 11,440,456, which issued on Sep. 13, 2022, and which is incorporated by reference herein in its entirety.

Referring now to FIG. 2 and FIGS. 3A-3C, an illustrative land vehicle 200 may be included in the line 100. In one example, the vehicle 200 may be similar to the delivery vehicle 150. The vehicle 200 is depicted with various external structures (e.g., a body having sidewalls, a rear compartment, a roof) omitted to better visualize a multi-segment chassis or main frame 210 thereof, among other things. In the illustrative arrangement, the chassis 210 is at least partially covered by a floor assembly 220 such that the chassis 210 and the floor assembly 220 extend in a longitudinal direction LD between a front end 202 of the vehicle 200 and a rear end 204 of the vehicle 200. The front end 202 includes a front bumper 206 and the rear end 204 includes a rear bumper 208, and each of the bumpers 206, 208 is coupled to, and supported by, the chassis 210.

The vehicle 200 illustratively includes a pair of front wheels 212 and a pair of rear wheels 214 supported by the chassis 210. The rear wheels 214 are arranged rearward of the front wheels 212 in the longitudinal direction LD. The illustrative floor assembly 220 includes a main floor body 222 and a pair of tire enclosure blocks 224 coupled to the main floor body 222 such that each of the tire enclosure blocks 224 extends above the main floor body 222 in a vertical direction VD. Each of the tire enclosure blocks 224 is sized to at least partially cover and enclose one of the rear wheels 214. In some embodiments, the floor assembly 220 does not include enclosure blocks or similar structures for the front wheels 212.

In the illustrative embodiment, the main floor body 222 is formed to include cutouts 226 extending inwardly therethrough in a lateral direction LD' perpendicular to the longitudinal direction LD. The cutouts 226 are illustratively aligned with the tire enclosure blocks 224 in the longitudinal direction LD and the lateral direction LD' such that the tire enclosure blocks 224 extend above and overhang the cutouts 226. When the rear wheels 214 are supported by the chassis 210 and the chassis 210 is covered and overlaid by the floor assembly 220, the cutouts 226 and the pair of tire enclosure blocks 224 cooperatively define wells 228 in which each one of the rear wheels 214 is disposed. Each of the wells 228 is sized to ensure spatial clearance between the tire mounted to a corresponding one of the rear wheels 214 and the corresponding enclosure block 224 covering the tire.

In the illustrative embodiment, the vehicle 200 includes a seatbelt tower assembly 230 supported by the chassis 210 and the floor assembly 220. The illustrative seatbelt tower assembly 230 is configured to secure a seatbelt (not shown) for an operator in an operator cabin 232. In some embodiments, the seatbelt tower assembly 230 may be similar to the seatbelt tower assembly 720 discussed in co-pending U.S. application Ser. No. 18/829,761, which was filed on Sep. 10, 2024, and which is incorporated by reference herein in its entirety.

In the illustrative embodiment, the vehicle 200 includes a seat frame assembly 240 supported by the chassis 210 and the floor assembly 220 that is configured to support a seat (not shown) for a passenger in the operator cabin 232. The seat frame assembly 240 is spaced from the seatbelt tower assembly 230 in the lateral direction LD' and aligned with the seatbelt tower assembly 230 in the longitudinal direction LD. In some embodiments, the seat frame assembly 240 may be similar to the seat frame assembly 730 discussed in co-pending U.S. application Ser. No. 18/829,761.

The multi-segment chassis 210 illustratively includes a front suspension subframe assembly 310 (see FIG. 3A) that supports the pair of front wheels 212, a rear suspension subframe assembly 330 that supports the pair of rear wheels 214, a power source cradle assembly 350 arranged between the front suspension subframe assembly 310 and the rear suspension subframe assembly 330 in the longitudinal direction LD, a midframe assembly 370 arranged at least partially between the front suspension subframe assembly 310 and at least a portion of the power source cradle assembly 350 in the longitudinal direction LD, and an electronics cradle assembly 390 arranged rearward of the rear suspension subframe assembly 330 in the longitudinal direction LD. As discussed below, the power source cradle assembly 350 is configured to support one or more electrical power sources 352 (e.g., battery packs) that may be used to supply power to one or more electric motors or drive units of the vehicle 200. Further, as discussed below, the electronics cradle assembly 390 is configured to support one or more electronic devices (not shown) distinct from the power sources 352. Further still, as discussed below, the power source cradle assembly 350 and the midframe assembly 370 cooperatively establish an enclosure 608 (see FIG. 6) in which the power sources 352 are at least partially enclosed in use of the vehicle 200.

In the illustrative embodiment, the vehicle 200 includes a pair of front suspension assemblies or systems 320A, 320B each coupled to one of the pair of front wheels 212 and the chassis 210 to support the pair of front wheels 212 for rotation relative to the chassis 210 in use of the vehicle 200. Additionally, the illustrative vehicle 200 includes a pair of rear suspension assemblies or systems 340A, 340B each coupled to one of the pair of rear wheels 214 and the chassis 210 to support the pair of rear wheels 214 for rotation relative to the chassis 210 in use of the vehicle 200. In some embodiments, the front suspension assemblies 320A, 320B may be identical or substantially similar to one another, and the rear suspension assemblies 340A, 340B may be identical or substantially similar to one another. Further, in some embodiments, the front suspension assemblies 320A, 320B may be different and/or structurally distinguishable from the rear suspension assemblies 340A, 340B.

Figure 5:
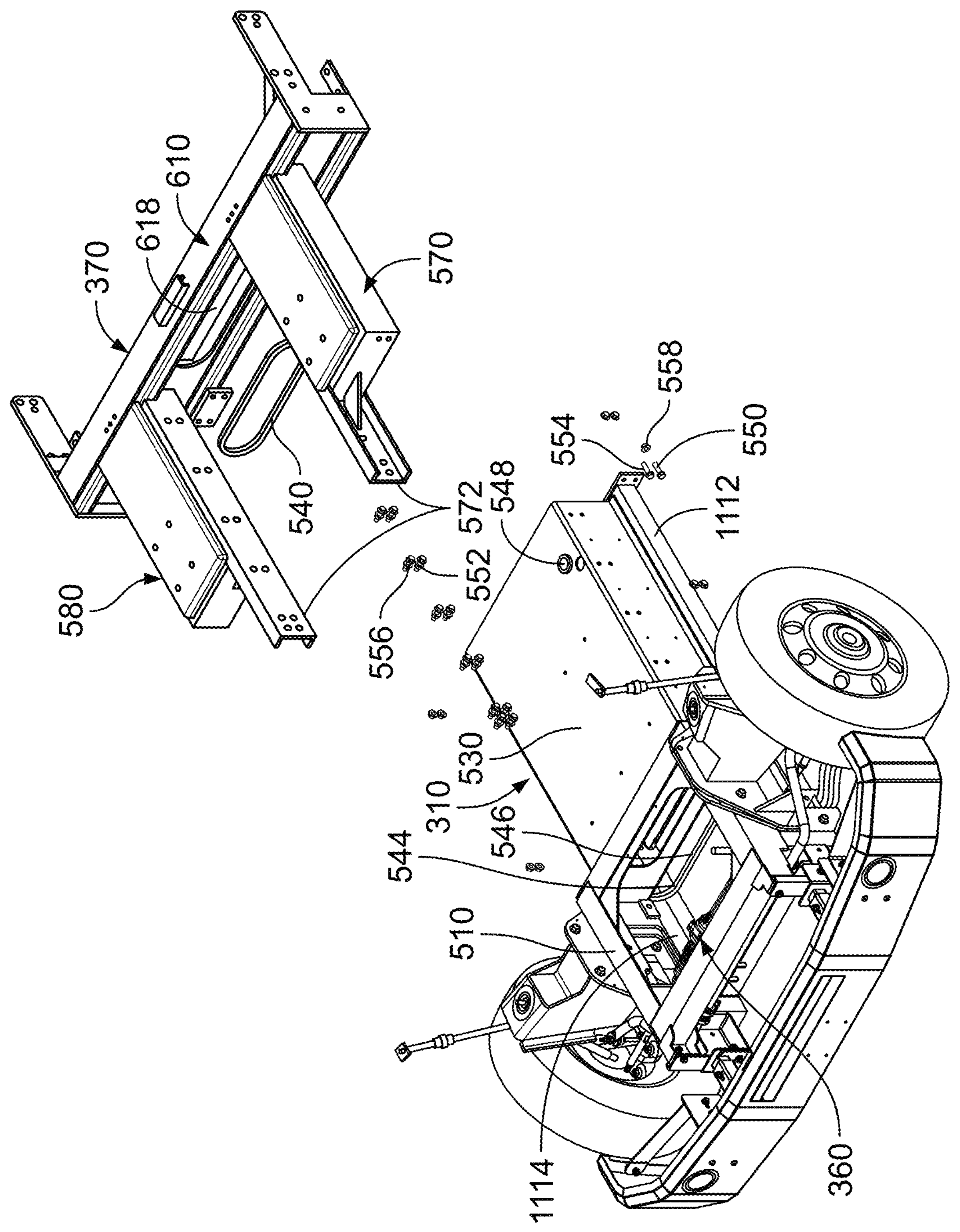
FIG. 5 is a perspective view of part of the chassis of FIG. 3A with certain features omitted for the sake of clarity that illustrates a pair of front suspension assemblies mounted to a front suspension subframe assembly of the chassis and a midframe assembly coupled to the front suspension subframe assembly.
Figure 10:
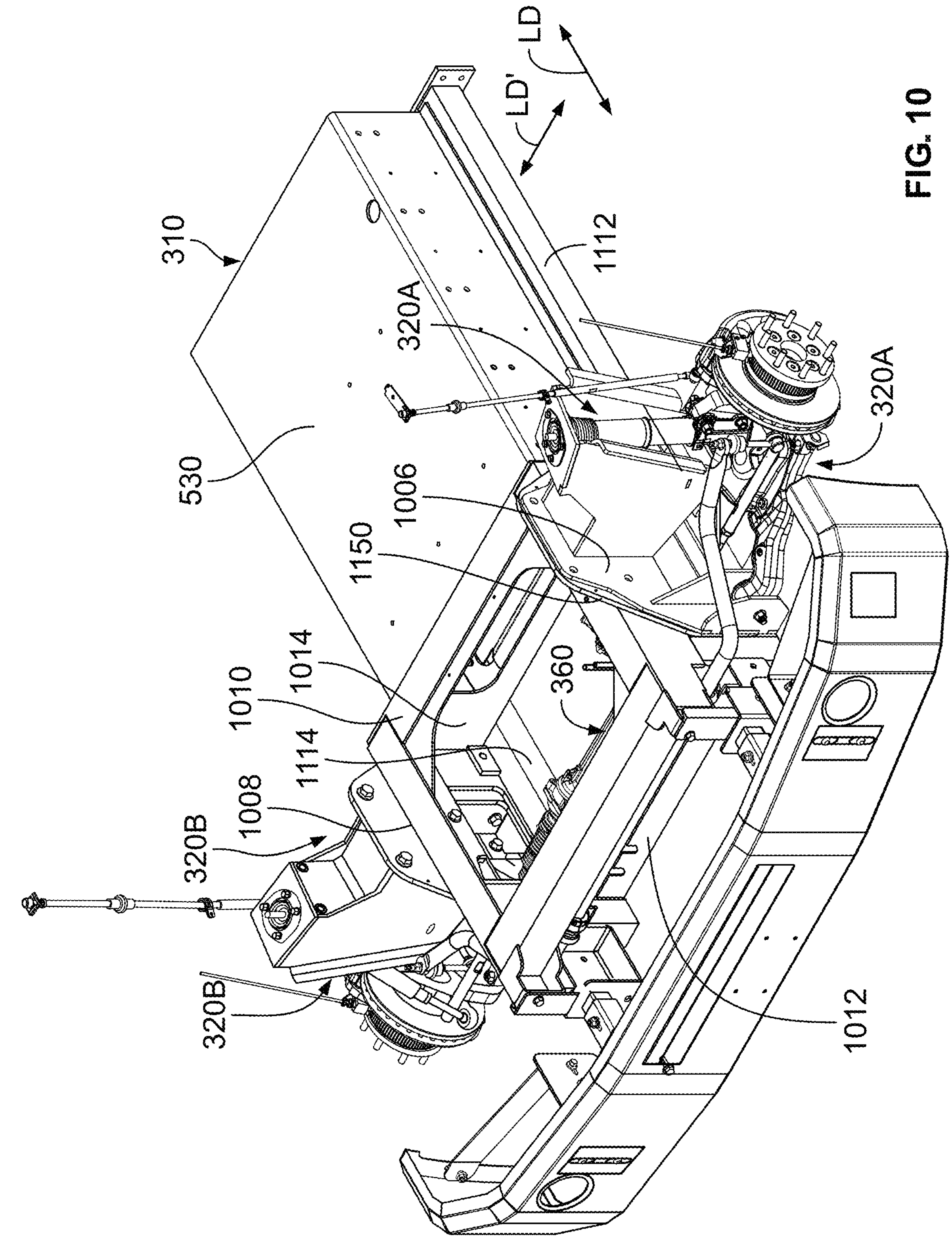
FIG. 10 is a perspective view of part of the chassis similar to FIG. 5A showing the pair of front suspension assemblies mounted to the front suspension subframe assembly with the midframe assembly omitted for the sake of clarity.
Figure 11:
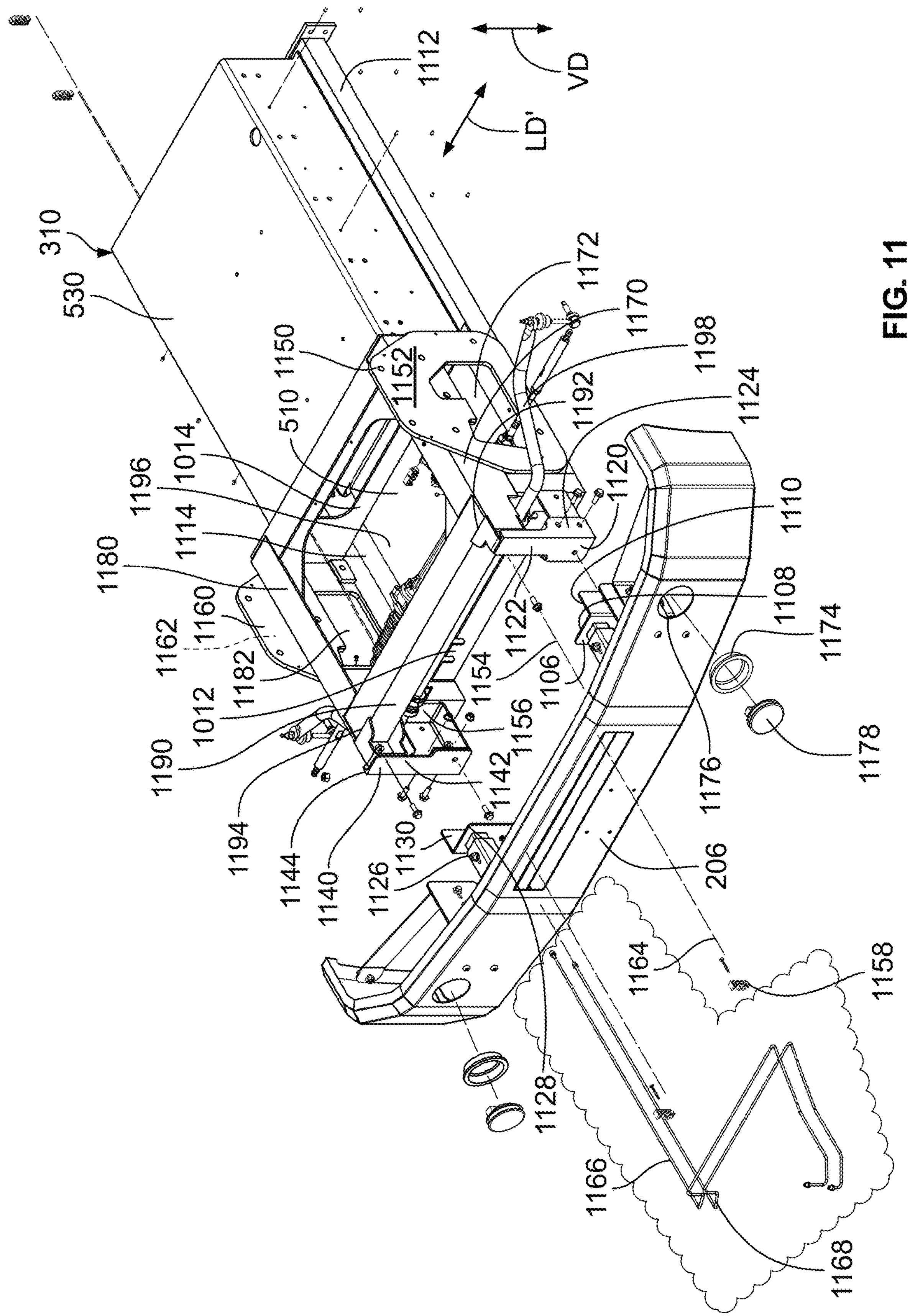
FIG. 11 is a partially exploded perspective view of the part of the chassis shown in FIG. 10 depicting the front suspension subframe assembly and a front bumper mounted thereto with the pair of front suspension assemblies omitted for the sake of clarity.
Figure 13:
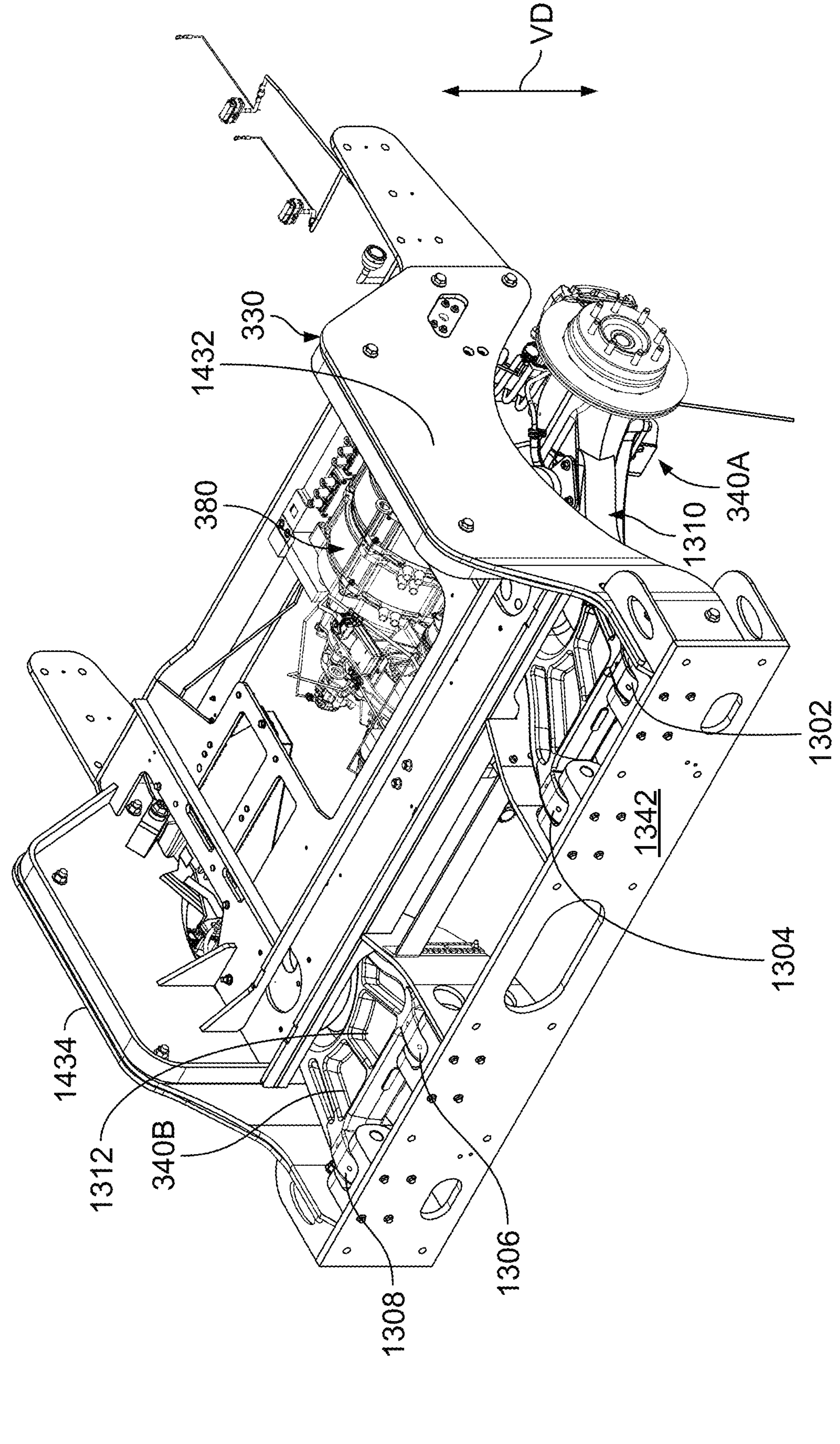
FIG. 13 is a perspective view of part of the chassis similar to FIG. 7 showing the rear suspension subframe assembly with the pair of rear suspension assemblies mounted thereto and the rear crossbeam assembly and the electronic cradle assembly omitted for the sake of clarity.
Figure 16:
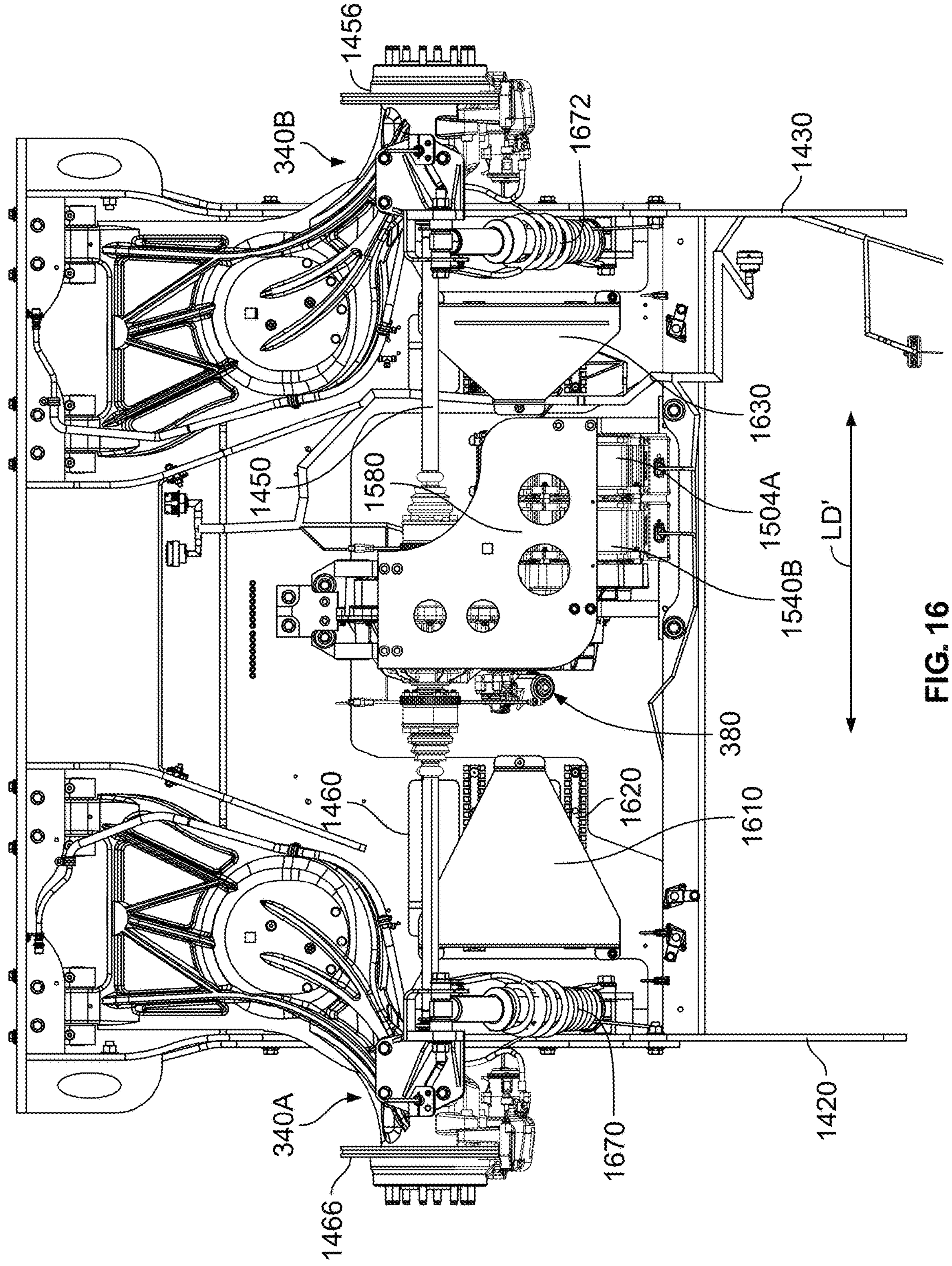
FIG. 16 is a bottom view of the part of the chassis shown in FIG. 13 depicting the rear suspension subframe assembly, the pair of rear suspension assemblies, and the rear powertrain assembly of the vehicle.

In the illustrative embodiment, the vehicle 200 includes a powertrain unit 360 that is supported by the front suspension subframe assembly 310 and coupled to the front wheels 212. Additionally, the vehicle 200 includes a powertrain unit 380 that is supported by the rear suspension subframe assembly 330 and coupled to the rear wheels 214. As shown in FIGS. 5, 10, and 11, the powertrain unit 360 extends in the lateral direction LD' through opposite sides 1006, 1008 (see FIG. 10) of a cage 1010 of the front suspension subframe assembly 310 such that the powertrain unit 360 is at least partially surrounded by the front suspension subframe assembly 310 at the sides 1006, 1008 of the cage 1010. As shown in FIGS. 13 and 16, the powertrain unit 380 is arranged beneath opposite sides 1432, 1434 of the rear suspension subframe assembly 330 in the vertical direction VD without being surrounded by the opposite sides 1432, 1434.

Figure 3A:
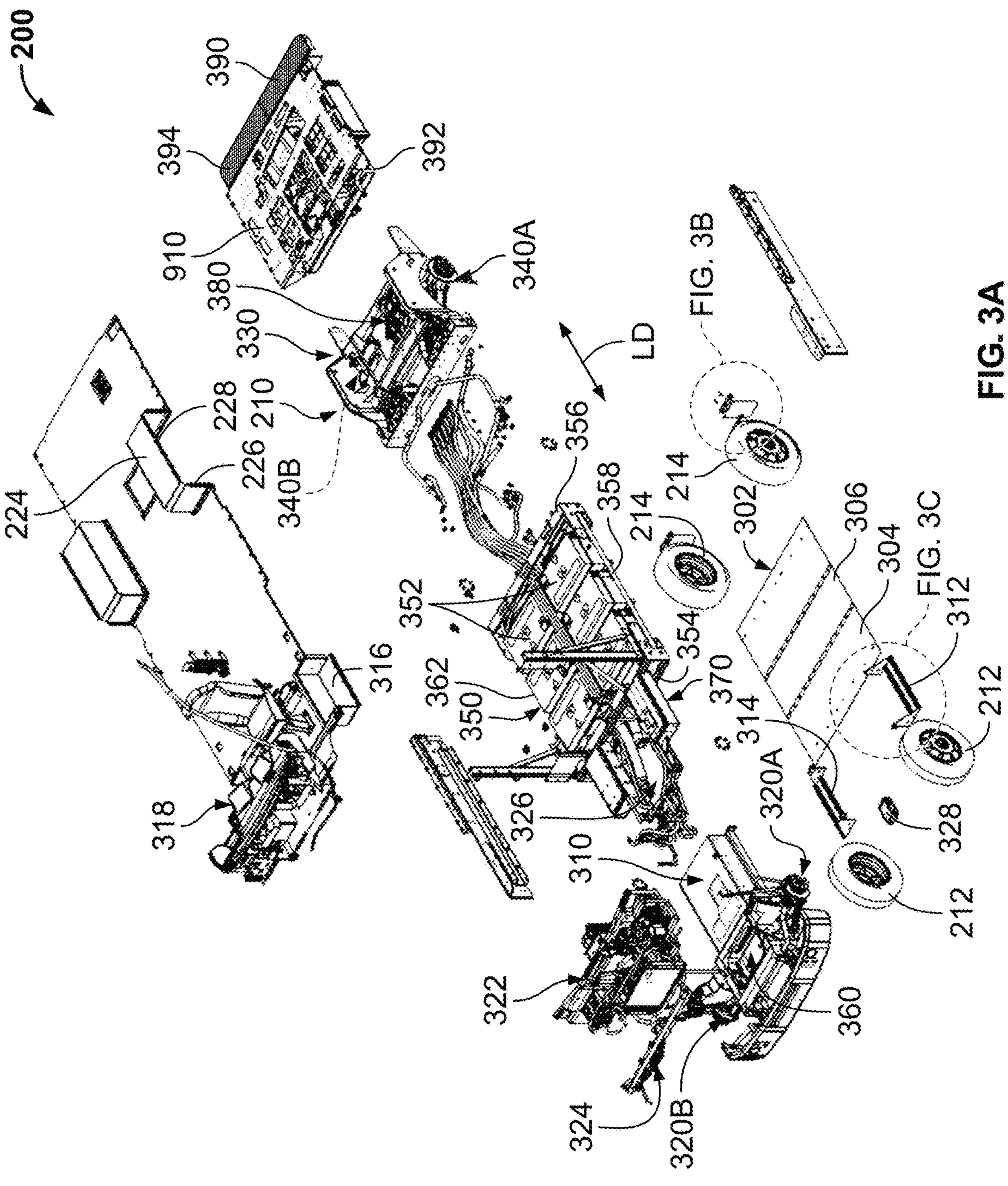
FIG. 3A is a partially exploded perspective view of the vehicle chassis of FIG. 2 depicting various sections or segments of the chassis arranged along a longitudinal axis.

The illustrative front suspension subframe assembly 310 of the chassis 210 includes base rails 1112, 1114 (see FIG. 11) that are spaced from one another in the lateral direction LD'. As shown in FIGS. 3A, 5, and 10, the front suspension assembly 320A is mounted to the base rail 1112 such that the front suspension assembly 320A is arranged outward of the base rail 1112 in the lateral direction LD'. Additionally, the front suspension assembly 320B is mounted to the base rail 1114 such that the front suspension assembly 320B is arranged outward of the base rail 1114 in the lateral direction LD'.

The illustrative rear suspension subframe assembly 330 of the chassis 210 includes a base plate 1410 (see FIG. 14), one frame arch 1420 coupled to the base plate 1410 at one lateral end 1412 thereof that defines the side 1432, and another frame arch 1430 coupled to the base plate 1410 at another lateral end 1414 thereof opposite the end 1412 that defines the side 1434. The rear suspension assembly 340A is mounted to the rear suspension subframe assembly 330 adjacent the frame arch 1420 such that the rear suspension assembly 340A is arranged at least partially inward of the frame arch 1420 in the lateral direction LD'. The rear suspension assembly 340B is mounted to the rear suspension subframe assembly 330 adjacent the frame arch 1430 such that the rear suspension assembly 340B is arranged at least partially inward of the frame arch 1430 in the lateral direction LD'.

Figure 9:
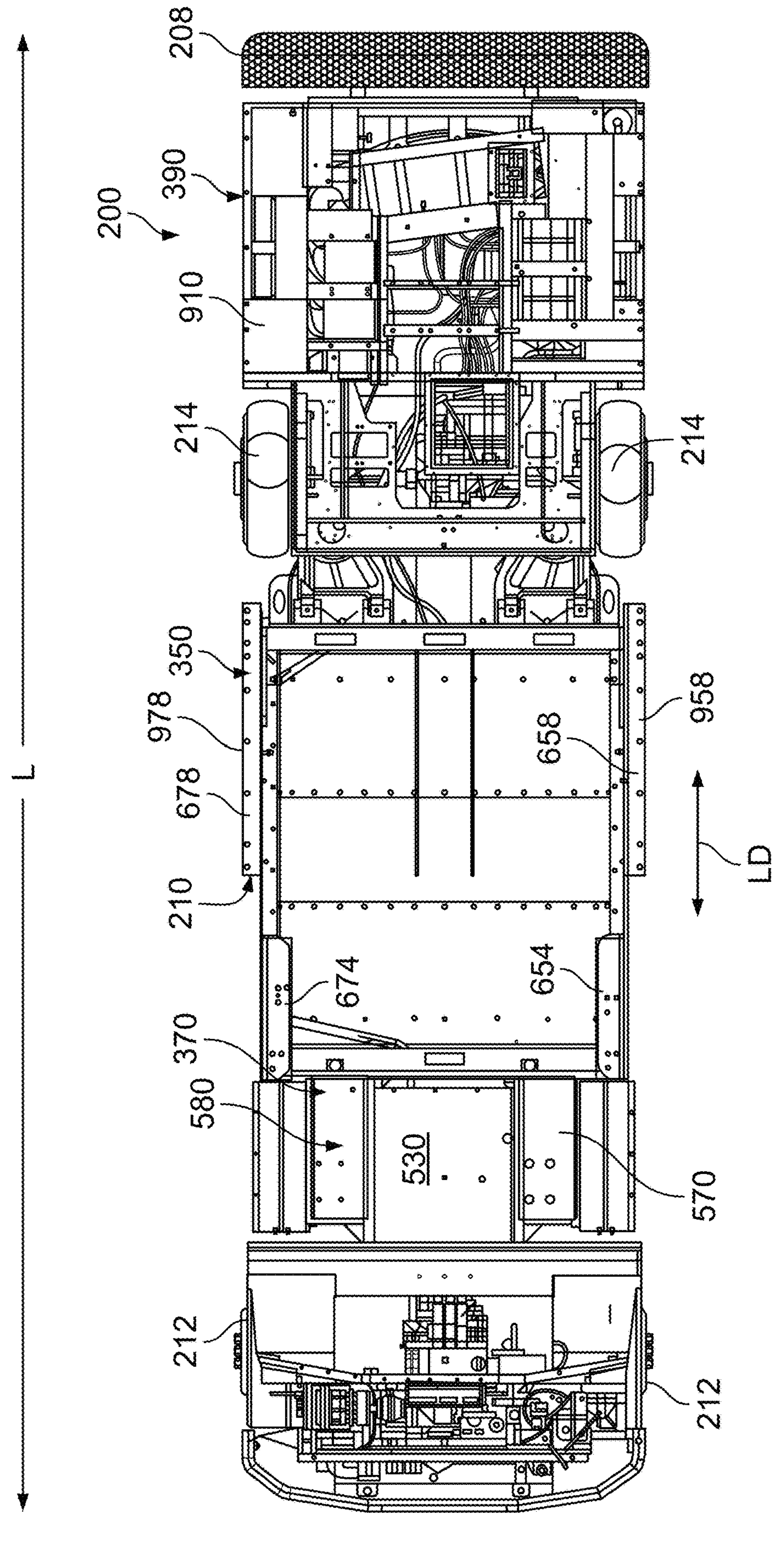
FIG. 9 is a top view of the vehicle chassis of FIG. 2 depicting various sections or segments of the assembled chassis arranged along a longitudinal axis.

The illustrative power source cradle assembly 350 of the chassis 210 is arranged between the front wheels 212 and the rear wheels 214 in the longitudinal direction LD. More specifically, as best seen in FIG. 9, the power source cradle assembly 350 is arranged midway along a length L of the vehicle 200 in the longitudinal direction LD between the front wheels 212 and the rear wheels 214. In the illustrative embodiment, the power source cradle assembly 350 is at least partially defined by, and directly coupled to, the midframe assembly 370, as discussed below.

The power source cradle assembly 350 illustratively includes a crossbeam assembly 610 (see FIG. 6), a crossbeam assembly 630, a sidewall assembly 650, and a sidewall assembly 670. The crossbeam assembly 610 is disposed at a forward end 354 of the power source cradle assembly 350 and extends in the lateral direction LD' between the sidewall assemblies 650, 670. The crossbeam assembly 630 is disposed at a rear end 356 of the power source cradle assembly 350 opposite the forward end 354 and extends in the lateral direction LD' between the sidewall assemblies 650, 670. The sidewall assembly 650 is disposed at a lateral side 358 of the power source cradle assembly 350 and extends in the longitudinal direction LD to couple the crossbeam assembly 610 and the crossbeam assembly 630. The sidewall assembly 670 is disposed at a lateral side 362 of the power source cradle assembly 350 opposite the side 358 and extends in the longitudinal direction LD to couple the crossbeam assembly 610 and the crossbeam assembly 630. In some embodiments, the crossbeam assemblies 610, 630 and the sidewall assemblies 650, 670 cooperatively establish the enclosure 608 for storing the power sources 352.

In some embodiments, the crossbeam assembly 610 may be included in, or otherwise form a portion of, the midframe assembly 370. In such embodiments, the midframe assembly 370 and the power source cradle assembly 350 may cooperatively establish the enclosure 608. Additionally, in some embodiments, the power source cradle assembly 350 at least partially houses a cooling air distribution chamber or plenum 690 (shown in phantom) in the enclosure 608. The plenum 690 may be configured to supply cooling air to the power sources 352 stored in the enclosure 608 to cool the power sources 352 in use thereof. In some embodiments, cooling air may be provided by one or more cooling air sources (e.g., one or more blowers, heat exchangers, or the like) adapted for positioning in the enclosure 608 or another suitable location.

The illustrative electronics cradle assembly 390 of the chassis 210 is arranged rearward of the rear wheels 214 in the longitudinal direction LD. More specifically, as best seen in FIG. 9, the electronics cradle assembly 390 is arranged rearward of the rear wheels 214 and forward of the rear bumper 208 in the longitudinal direction LD. In the illustrative embodiment, the electronics cradle assembly 390 includes a cover plate 910 (see FIG. 9) that extends from a forward end 392 of the electronics cradle assembly 390 to a rear end 394 of the electronics cradle assembly 390 arranged opposite the forward end 392 to at least partially cover the electronic devices supported by the cradle assembly 390 in use thereof.

As shown in FIG. 3A, the illustrative vehicle 200 includes a variety of features in addition to the aforementioned devices, assemblies, and/or systems. Those features include, but are not limited to, the following: a skid plate system 302 arranged beneath at least a portion of the front suspension subframe assembly 310 and/or the midframe assembly 370 in the vertical direction VD that includes skid plates 304 and 306; step supports 312, 314 each affixed to a step platform 316 that is located at least partially beneath the main floor body 222 in the vertical direction VD; an instrument panel assembly 318 arranged in the operator cabin 232 above the main floor body 222 in the vertical direction VD; a firewall assembly 322 arranged between the front bumper 206 and the instrument panel assembly 318 in the longitudinal direction LD; a crossbar assembly 324 coupled to the firewall assembly 322 that extends across the firewall assembly 322 in the lateral direction LD'; one or more wiring harnesses or carriers 326 for routing and/or carrying various electrical cables or wiring that may be arranged at least partially between the front suspension subframe assembly 310 and the midframe assembly 370 in the longitudinal direction LD; and a junction box 328.

Figure 3B:
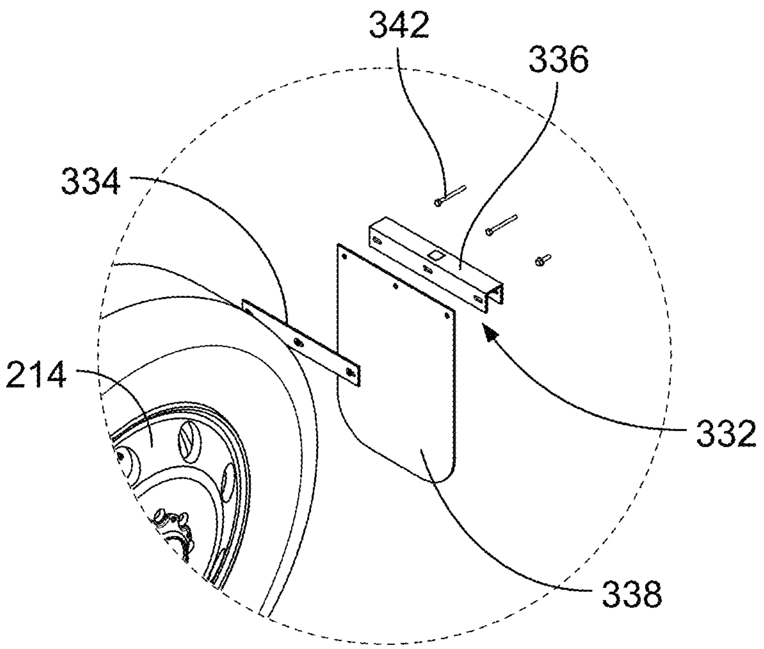
FIG. 3B is a magnified view of one portion of the vehicle chassis of FIG. 3A.

As shown in FIG. 3B, the illustrative vehicle 200 includes a mudflap assembly 332 mounted adjacent to each one of the rear wheels 214. In some embodiments, each mudflap assembly 332 is mounted adjacent to the corresponding rear wheel 214 such that each mudflap assembly 332 is arranged at least partially rearward of the corresponding rear wheel 214 in the longitudinal direction LD. Each mudflap assembly 332 includes a mudflap mount bracket 334, a mudflap support bar 336, a mudflap 338, and one or more fasteners 342. The mudflap mount bracket 334 is mounted to the chassis 210 (e.g., the rear suspension subframe assembly 330). The mudflap support bar 336 is coupled to the mudflap mount bracket 334 using the fasteners 342 when the mudflap 338 is sandwiched between the mudflap mount bracket 334 and the mudflap support bar 336.

Figure 3C:
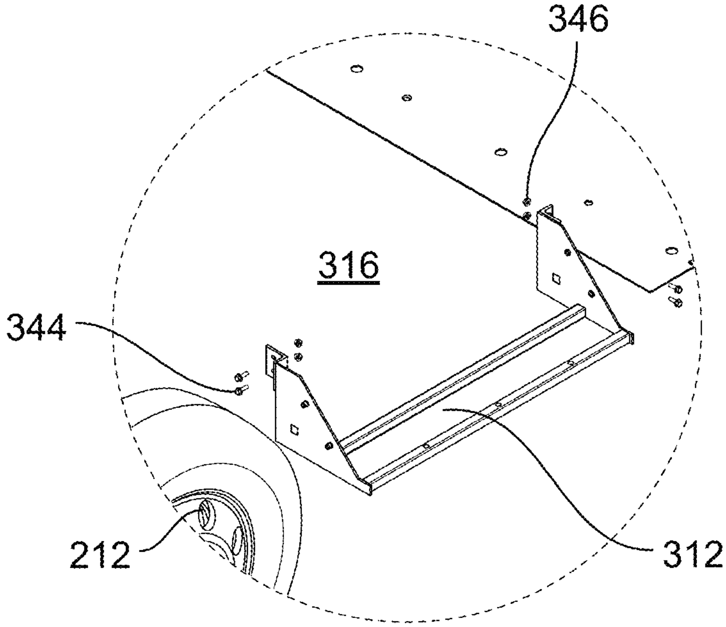
FIG. 3C is a magnified view of another portion of the vehicle chassis of FIG. 3A.

As shown in FIG. 3C, the step supports 312, 314 (note that only step support 312 is depicted) are affixed to the step platforms 316 adjacent to each one of the front wheels 212. In some embodiments, each step support 312, 314 is affixed to the corresponding step platform 316 such that each step support 312, 314 is arranged at least partially rearward of the corresponding front wheel 212 in the longitudinal direction LD. Each step support 312, 314 is affixed to the corresponding step platform 316 using one or more fasteners 344 and one or more locknuts 346.

Figure 4A:
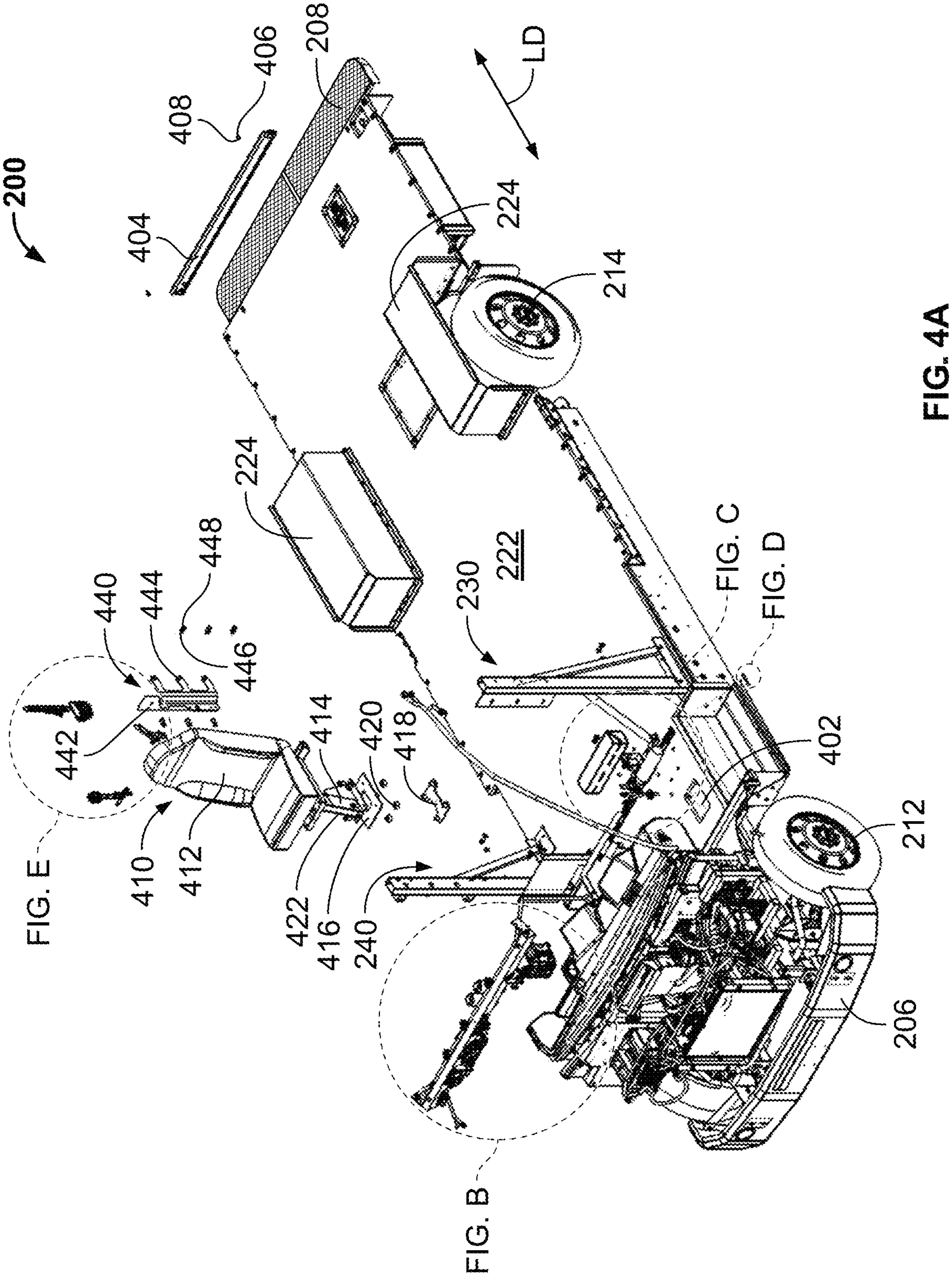
FIG. 4A is a partially exploded perspective view of the vehicle chassis of FIG. 2 showing at least one seat frame assembly de-coupled from the chassis and a pair of seatbelt tower assemblies coupled to the chassis.

Referring now to FIG. 4A, the vehicle 200 is illustrated with the chassis 210 covered by the floor assembly 220 and each of the seatbelt tower assembly 230 and the seat frame assembly 240 mounted to the floor assembly 220. A driver's seat assembly 410 and a driver's seatbelt assembly 440 are illustrated in the partially exploded view of FIG. 4 as being adapted for positioning in the operator cabin 232. The driver's seat assembly 410 includes a driver seat 412, a seat pedestal 414, a seat mount plate 416, a weldment plate 418, spacers 420, and fastener(s) 422. The driver's seatbelt assembly 440 includes a bulkhead mount 442, a seatbelt mount bracket 444, fastener(s) 446, and nut(s) 448.

In the illustrative embodiment, the floor assembly 220 (e.g., the main floor body 222) is formed to include a rectangular cavity 402 disposed in the operator cabin 232. In some embodiments, the cavity 402 may extend in the vertical direction VD through the floor assembly 220 to the chassis 210. The driver's seat 412 is coupled to and supported above the floor assembly 220 by the seat pedestal 414, and the seat pedestal 414 is mounted to the floor assembly 220 and/or the chassis 210 using the seat mount plate 416, the weldment plate 418, the spacers 420, and the fasteners 422. In the illustrative mounting arrangement, the spacers 420 are arranged between the seat mount plate 416 and the weldment plate 418 in the vertical direction VD. In some embodiments, when the seat assembly 410 is mounted in the cabin 232, one or more of the seat mount plate 416, the weldment plate 418, and the spacers 420 are at least partially positioned in the cavity 402. Additionally, in some embodiments, when the seat assembly 410 is mounted in the cabin 232, at least one component thereof (e.g., the weldment plate 418) indirectly or directly contacts the front suspension subframe assembly 310 of the chassis 210.

In the illustrative embodiment, the driver's seatbelt assembly 440 is adapted for securement to a bulkhead (not shown) at least partially positioned in the operator cabin 232. More specifically, the bulkhead mount 442 is configured for direct interaction and/or contact with the bulkhead and the seatbelt mount bracket 444 may be coupled to the bulkhead mount 442 using the fasteners 446 and the nuts 448. In some embodiments, the fasteners 446 may be identical or substantially identical to the fasteners 422. Additionally, in some embodiments, when the seatbelt assembly 440 is secured to the bulkhead, the seatbelt assembly 440 may be at least partially supported by the seatbelt tower assembly 230.

A rear bumper plate 404 is illustratively included in the rear bumper 208 as shown in FIG. 4A. The rear bumper plate 404 may be mounted to the chassis 210 (e.g., the electronics cradle assembly 390) using one or more fasteners 406 and one or more nuts 408. In the illustrative embodiment, a number of sensors configured for interaction with, and/or mounting to, the rear bumper plate 404 are omitted.

Figure 4B:
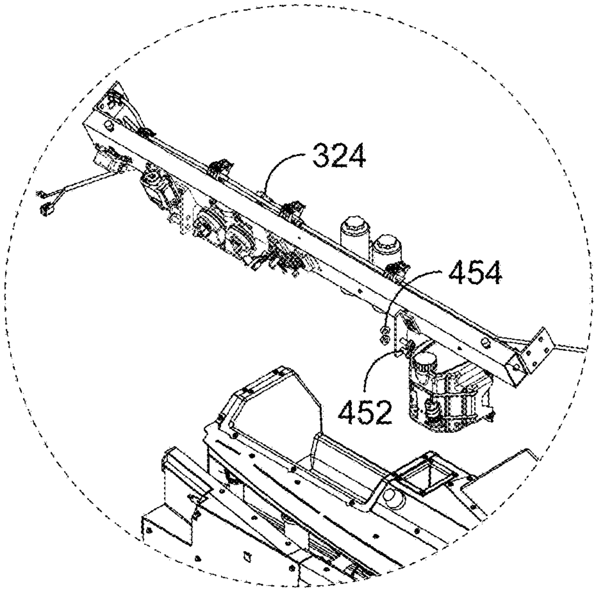
FIG. 4B is a magnified view of one portion of the vehicle chassis of FIG. 4A.

As shown in FIG. 4B, the crossbar assembly 324 is adapted to be coupled to the firewall assembly 322 using one or more fasteners 452 and one or more nuts 454. In some embodiments, when the crossbar assembly 324 is coupled to the firewall assembly 322, the assemblies 322, 324 are arranged beneath a hood (not shown) of a body of the vehicle 200. Additionally, in some embodiments, the assemblies 322, 324 may include, or otherwise provide, structural reinforcement features configured for deformation in response to impact forces applied proximate the front end 202 of the vehicle 200.

Figure 4C:
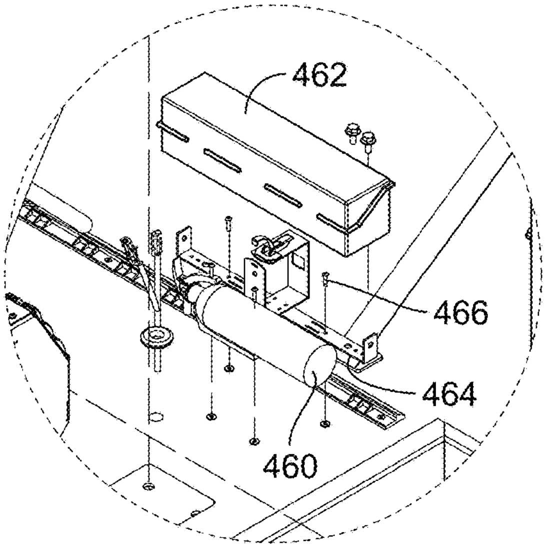
FIG. 4C is a magnified view of another portion of the vehicle chassis of FIG. 4A.

As shown in FIG. 4C, the illustrative vehicle 200 includes a fire extinguisher 460, a triangle kit 462, a mounting bracket 464, and one or more fasteners 466. In some embodiments, the fire extinguisher 460 is removably attached to the floor assembly 220 (e.g., the main floor body 222) such that the fire extinguisher 460 is arranged between the cavity 402 and the seatbelt tower assembly 230 in the longitudinal direction LD. Additionally, in some embodiments, the triangle kit 462 is removably mounted to the floor assembly 220 (e.g., the main floor body 222) using the mounting bracket 464 and the fasteners 466 such that the triangle kit 464 is arranged between the cavity 402 and the seatbelt tower assembly 230 in the longitudinal direction LD. Further, in some embodiments, when the fire extinguisher 460 and the triangle kit 462 are attached to the floor assembly 220, the fire extinguisher 460 and the triangle kit 462 are arranged in the vertical direction VD below the driver's seat assembly 410.

Figure 4D:
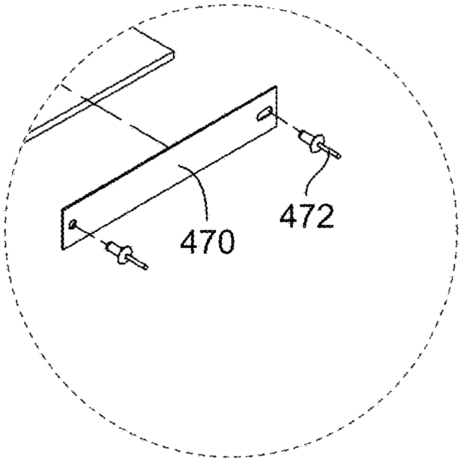
FIG. 4D is a magnified view of yet another portion of the vehicle chassis of FIG. 4A

As shown in FIG. 4D, the illustrative vehicle 200 includes a plate 470 that may be coupled to a suitable structure using one or more rivets 472. In one example, the plate 470 may be coupled to a structure (e.g., the instrument panel assembly 318) arranged in the operator cabin 232. In another example, the plate 470 may be coupled to a structure of the floor assembly 220 (e.g., one of the step platforms 316 or one of the step supports 312, 314) and arranged in close proximity to the operator cabin 232. In yet another example, the plate 470 may be coupled to a structure of the chassis 210 (e.g., the front suspension subframe assembly 310) and arranged in close proximity to the operator cabin 232. Regardless, in some embodiments, the plate 470 may include vehicle identification information (e.g., the vehicle identification number (VIN)) for the vehicle 200.

Figure 4E:
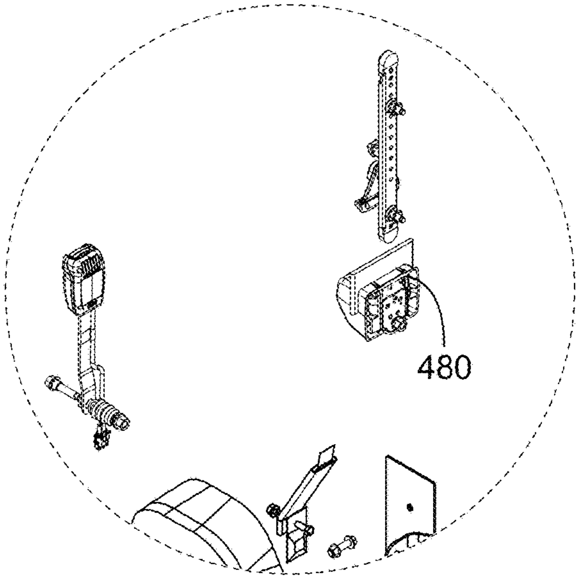
FIG. 4E is a magnified view of another portion still of the vehicle chassis of FIG. 4A.

As shown in FIG. 4E, the illustrative vehicle 200 includes a seatbelt mechanism 480 adapted for inclusion in the driver's seatbelt assembly 440. In one example, the seatbelt mechanism 480 may be directly coupled to the bulkhead mount 442 and/or the seatbelt mount bracket 444. In another example, the seatbelt mechanism 480 may be directly coupled to one or more structures included in the seatbelt tower assembly 230. In any case, in some embodiments, the seatbelt mechanism 480 includes, or is otherwise embodied as, a 3-point seat belt/lap belt mechanism.

Referring now to FIG. 5, the illustrative front suspension subframe assembly 310 includes a powertrain unit cradle 510 and a base block 530 coupled to the powertrain unit cradle 510 and arranged rearward of the powertrain unit cradle 510 in the longitudinal direction LD. The powertrain unit cradle 510 at least partially houses the powertrain unit 360 of the vehicle 200. The powertrain unit cradle 510 and the base block 530 are illustratively mounted to and supported by the base rails 1112, 1114.

The illustrative midframe assembly 370 includes support arm structures 570, 580 that are spaced apart from one another in the lateral direction LD'. As best seen in FIG. 9, when the vehicle 200 is assembled, the front suspension subframe assembly 310 is coupled to the midframe assembly 370 such that the base block 530 is arranged between the support arm structures 570, 580 in the lateral direction LD'. Additionally, when the vehicle 200 is assembled, the front suspension subframe assembly 310 is coupled to the midframe assembly 370 such that the base block 530 is aligned with the support arm structures 570, 580 in the longitudinal direction LD.

In some embodiments, when the front suspension subframe assembly 310 is coupled to the midframe assembly 370, the support arm structure 570 interfaces with, and may be directly coupled to, the base rail 1112. Additionally, in some embodiments, when the front suspension subframe assembly 310 is coupled to the midframe assembly 370, the support arm structure 580 interfaces with, and may be directly coupled to, the base rail 1114. In any case, in the illustrative embodiment, when the front suspension subframe assembly 310 is coupled to the midframe assembly 370, the base block 530 and the rails 1112, 1114 are at least partially received in a gap 572 extending in the lateral direction LD' between the support arm structures 570, 580.

As shown in FIG. 5, the illustrative vehicle 200 includes a variety of features in addition to the aforementioned devices, assemblies, and/or systems. Those features include, but are not limited to, the following: an oval trim piece 540 coupled to the crossbeam assembly 610 such that the trim piece 540 surrounds a central aperture 618 formed in the crossbeam assembly 610; a trim piece 544 at least partially disposed in the cage 1010 of the front suspension subframe assembly 310; a brake line connector 546 at least partially disposed in the cage 1010; one or more grommets 548; one or more fasteners 550; one or more fasteners 552 that may be distinguishable from the fasteners 550; one or more fasteners 554 that may be distinguishable from the fasteners 550, 552; one or more nuts 556; and one or more nuts 558 that may be distinguishable from the nuts 556.

Figure 6:
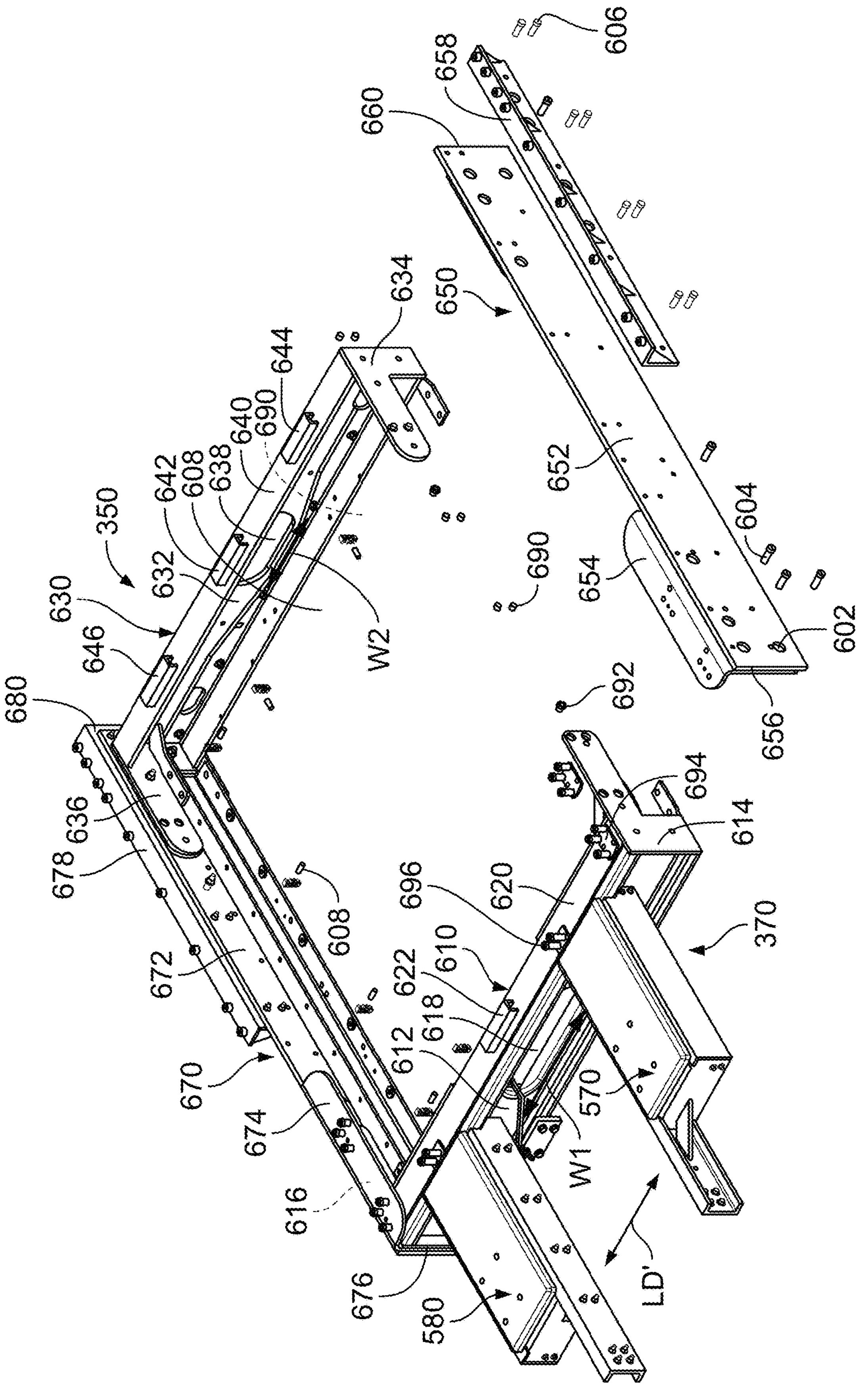
FIG. 6 is a perspective view of part of the chassis of FIG. 3A with certain features omitted for the sake of clarity that illustrates the midframe assembly coupled to various structures to at least partially define a power source cradle assembly.

Referring now to FIG. 6, in the illustrative embodiment, the support arm structures 570, 580 of the midframe assembly 370 are directly affixed to the crossbeam assembly 610 of the power source cradle assembly 350 which extends in the lateral direction LD' to couple the structures 570, 580 to one another. In some embodiments, the crossbeam assembly 610 may be said to at least partially define the midframe assembly 370. The crossbeam assembly 610, the crossbeam assembly 630, and the sidewall assemblies 650, 670 of the power source cradle assembly 350 are illustratively provided as separate structures coupled to one another to establish the enclosure 608. The illustrative enclosure 608 has a rectangular shape. Of course, in other embodiments, the enclosure 608 may take the shape of other suitable geometric forms.

In the illustrative embodiment, the crossbeam assemblies 610, 630 are structurally distinguishable from one another in at least one aspect. In other embodiments, however, the crossbeam assemblies 610, 630 may be identical or substantially identical to one another. Regardless, the illustrative crossbeam assemblies 610, 630 define opposite ends of the power source cradle assembly 350 in the longitudinal direction LD.

As shown in FIGS. 5 and 6, the illustrative crossbeam assembly 610 includes a main body panel 612 arranged to extend in the lateral direction LD' between mount brackets 614, 616 coupled to the main body panel 612 at opposite lateral sides thereof. The mount brackets 614, 616 extend in the longitudinal direction LD toward corresponding structures included in the crossbeam assembly 630. The mount bracket 614 and a corresponding structure of the crossbeam assembly 630 are directly affixed to a sidewall panel 652 of the sidewall assembly 650. The mount bracket 616 and a corresponding structure of the crossbeam assembly 630 are directly affixed to a sidewall panel 672 of the sidewall assembly 670.

The main body panel 612 of the crossbeam assembly 610 is formed to include the central aperture 618 extending therethrough that is located midway between the mount brackets 614, 616 in the lateral direction LD'. The aperture 618 has a width W1 in the lateral direction LD'. In the illustrative embodiment, an upwardly-facing surface 620 of the main body panel 612 in the vertical direction VD is coupled to a standoff bar 622. The standoff bar 622 is aligned with the central aperture 618 in the lateral direction LD'.

As shown in FIG. 6, the illustrative crossbeam assembly 630 includes a main body panel 632 arranged to extend in the lateral direction LD' between mount brackets 634, 636 coupled to the main body panel 632 at opposite lateral sides thereof. The mount brackets 634, 636 extend in the longitudinal direction LD toward corresponding mount brackets 614, 616 of the crossbeam assembly 610. The mount bracket 634 and the mount bracket 614 are directly affixed to the sidewall panel 652 of the sidewall assembly 650. The mount bracket 636 and the mount bracket 616 are directly affixed to the sidewall panel 672 of the sidewall assembly 670.

The main body panel 632 of the crossbeam assembly 630 is formed to include a central aperture 638 extending therethrough that is located midway between the mount brackets 634, 636 in the lateral direction LD'. The aperture 638 has a width W2 in the lateral direction LD' that is less than the width W1 of the aperture 618, at least in some embodiments. In the illustrative embodiment, an upwardly-facing surface 640 of the main body panel 632 in the vertical direction VD is coupled to standoff bars 642, 644, 646. The standoff bar 642 is aligned with the central aperture 638 in the lateral direction LD'. The standoff bars 644, 646 are arranged on opposite sides of the standoff bar 642.

In the illustrative embodiment, the sidewall assemblies 650, 670 are identical or substantially similar to one another. In other embodiments, however, the sidewall assemblies 650, 670 may be distinguishable from one another in at least one aspect. In any case, the illustrative sidewall assemblies 650, 670 define opposite exterior sides of the power source cradle assembly 350 in the lateral direction LD'.

The illustrative sidewall assembly 650 includes a sidewall panel 652 and a flap or tab 654 interconnected with the sidewall panel 652. The sidewall panel 652 has a rectangular shape and is arranged to extend in the vertical direction VD. The flap 654 is interconnected with the sidewall panel 652 such that the flap 654 extends in the lateral direction LD' (which may also be referred to as a horizontal direction) perpendicular or substantially perpendicular to the vertical direction VD. In the illustrative embodiment, the sidewall panel 652 is integral with or integrally formed with the flap 654. In other embodiments, the sidewall panel 652 and the flap 654 may be provided as separate structures that are coupled to one another.

The illustrative flap 654 is disposed at a forward end 656 of the sidewall assembly 650. The sidewall assembly 650 also includes a floor support bar 658 that is coupled to the sidewall panel 652 and positioned for direct contact with an overlying structure (e.g., the main floor body 222). In some embodiments, when coupled to the sidewall panel 652, the floor support bar 658 extends above the sidewall panel 652 in the vertical direction VD. In any case, the floor support bar 658 is disposed at a rear end 660 of the sidewall assembly 650 arranged opposite the forward end 656.

The illustrative sidewall assembly 670 includes a sidewall panel 672 and a flap or tab 674 interconnected with the sidewall panel 672. The sidewall panel 672 has a rectangular shape and is arranged to extend in the vertical direction VD. The flap 674 is interconnected with the sidewall panel 672 such that the flap 674 extends in the lateral direction LD' perpendicular or substantially perpendicular to the vertical direction VD. In the illustrative embodiment, the sidewall panel 672 is integral with or integrally formed with the flap 674. In other embodiments, the sidewall panel 672 and the flap 674 may be provided as separate structures that are coupled to one another.

The illustrative flap 674 is disposed at a forward end 676 of the sidewall assembly 670. The sidewall assembly 670 also includes a floor support bar 678 that is coupled to the sidewall panel 672 and positioned for direct contact with an overlying structure (e.g., the main floor body 222). In some embodiments, when coupled to the sidewall panel 672, the floor support bar 678 extends above the sidewall panel 672 in the vertical direction VD. In any case, the floor support bar 678 is disposed at a rear end 680 of the sidewall assembly 670 arranged opposite the forward end 676.

As shown in FIG. 6, the illustrative vehicle 200 includes a variety of features in addition to the aforementioned devices, assemblies, and/or systems. Those features include, but are not limited to, the following: one or more washers 602; one or more fasteners 604; one or more fasteners 606 that may be distinguishable from the fasteners 604; one or more fasteners 608 that may be distinguishable from the fasteners 604, 606; one or more nuts 690; one or more nuts 692 that may be distinguishable from the nuts 690; one or more weldments 694; and one or more weldments 696 that may be distinguishable from the weldments 694.

Figure 7:
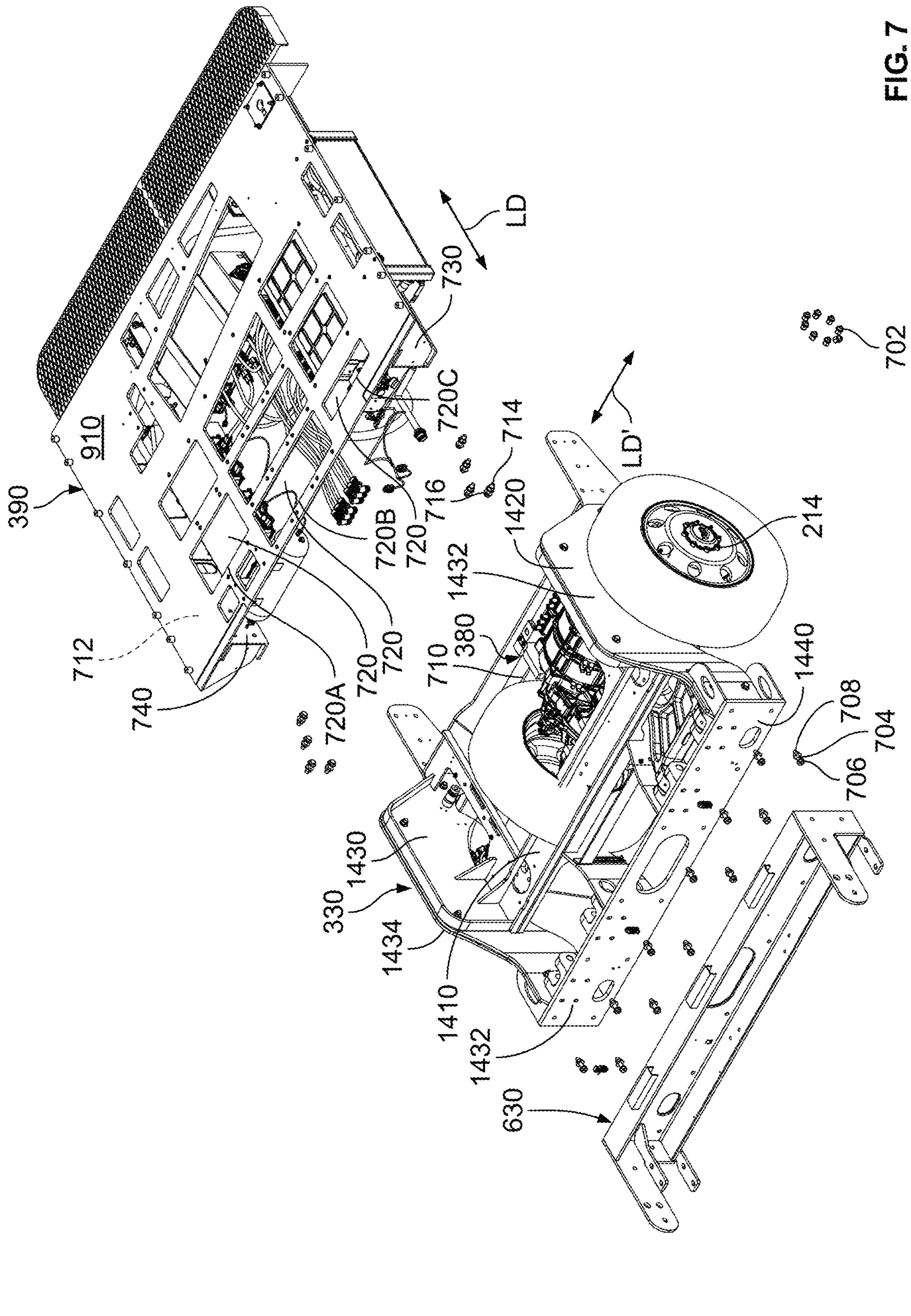
FIG. 7 is a perspective view of part of the chassis of FIG. 3A with certain features omitted for the sake of clarity that illustrates a rear crossbeam assembly of the power source cradle assembly, a pair of rear suspension assemblies mounted to a rear suspension subframe assembly of the chassis, and an electronics cradle assembly supporting a plurality of electronic devices of the vehicle.

Referring now to FIG. 7, the crossbeam assembly 630 of the power source cradle assembly 350 is arranged adjacent to, and forward of, the rear suspension subframe assembly 330 in the longitudinal direction LD. As discussed above, the rear suspension subframe assembly 330 supports the pair of rear suspension assemblies 340A, 340B and the powertrain unit 380, and the suspension assemblies 340A, 340B and the powertrain unit 380 are likewise arranged rearward of the crossbeam assembly 630 in the longitudinal direction LD. The electronics cradle assembly 390 is arranged rearward of the rear suspension assemblies 340A, 340B and the powertrain unit 380 in the longitudinal direction LD.

As mentioned above, the rear suspension subframe assembly 330 includes the base plate 1410, the frame arch 1420, and the frame arch 1430. The rear suspension subframe assembly 330 also includes a faceplate 1442 (see FIG. 14) that is coupled to the frame arches 1420, 1430 at respective forward ends 1422, 1432 thereof. An exterior side 1342 of the faceplate 1442 is arranged in confronting relation to the crossbeam assembly 630 and spaced from (e.g., arranged forward of) the base plate 1410 in the longitudinal direction LD. The base plate 1410 includes a central cavity 710 in which the powertrain unit 380 is at least partially positioned.

The cover plate 910 of the illustrative electronics cradle assembly 390 extends rearward of the base plate 1410 and at least a portion of each of the frame arch 1420 and the frame arch 1430 in the longitudinal direction LD. In the illustrative embodiment, the cover plate 910 is formed to include slots 720. The slots 720 include at least three slot rows 720A, 720B, 720C that are spaced from one another in the lateral direction LD'. In at least some embodiments, provision of the slots 720 in the cover plate 910 may facilitate dissipation of heat produced by electronic devices supported by the cradle assembly 390 in use thereof.

The illustrative electronics cradle assembly 390 includes two channel feet 730, 740 coupled to an underside 712 (shown in phantom) of the cover plate 910. The channel feel 730, 740 are spaced from one another in the lateral direction LD' when coupled to the cover plate 910. In the illustrative embodiment, each of the channel feet 730, 740 has a C-shaped cross-section.

As shown in FIG. 7, the illustrative vehicle 200 includes a variety of features in addition to the aforementioned devices, assemblies, and/or systems. Those features include, but are not limited to, the following: one or more wheel lug nuts 702; one or more washers 704; one or more fasteners 706; one or more nuts 708; one or more fasteners 714 that may be distinguishable from the one or more fasteners 706; and one or more nuts 716 that may be distinguishable from the one or more nuts 708.

Figure 8A:
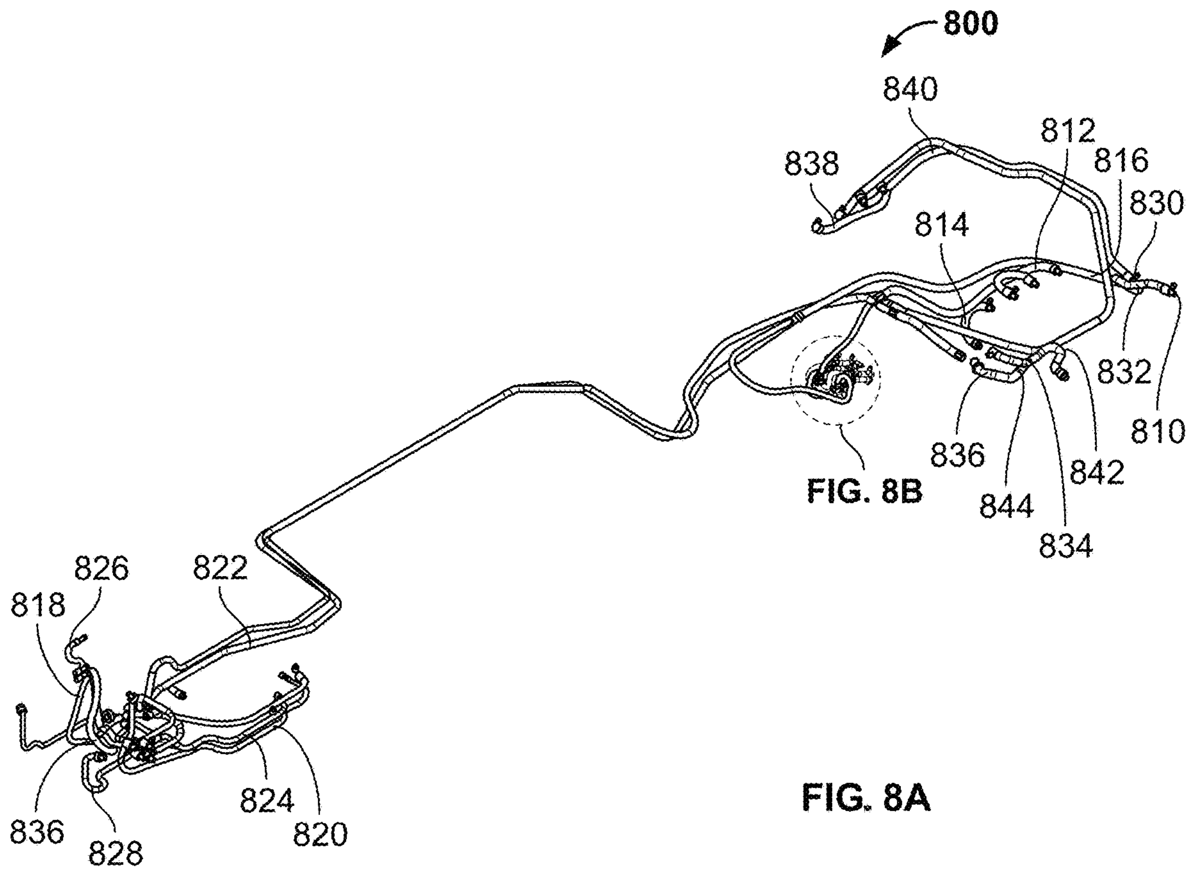
FIG. 8A is a perspective view of part of the chassis of FIG. 3A with certain features omitted for the sake of clarity that illustrates a collection of hoses or cables for supplying electrical power to various devices.

Referring now to FIG. 8A, the illustrative vehicle 200 includes a network 800 of components that may be used to deliver electrical power to various electronic devices of the vehicle 200. As discussed below, some components of the network 800 include, or are otherwise embodied as, electrical hoses, hose kits, cables, or segments thereof capable of delivering electrical power (e.g., power produced by the power sources 352) to various electronic devices of the vehicle 200. In some embodiments, the electrical hoses and/or cables included in the network 800 may be routed from the electronics cradle assembly 390 to electronic devices arranged in other sections of the multi-segment chassis 210, such as one or more electronic devices arranged in the front suspension subframe assembly 310, the rear suspension subframe assembly 330, the power source cradle assembly 350, and/or the midframe assembly 370, for example.

The illustrative network 800 includes a hose clamp 810, a hose or hose kit 812, a hose 814, a hose or hose kit 816, a hose or hose kit 818, a hose 820, a hose or hose kit 822, a hose or hose kit 824, a hose or hose kit 826, a hose 828, a fitting 830, a hose 832, a fitting 834, a hose 836, a hose 838, a hose 840, a hose 842, and a hose 844. It should be appreciated that each of the hoses or hose kits 812, 814, 816, 818, 820, 822, 824, 826, 828, 832, 836, 838, 840, 842, 844 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses or hose kits 812, 814, 816, 818, 820, 822, 824, 826, 828, 832, 836, 838, 840, 842, 844 may be retained and/or secured with one or more clamps (e.g., the hose clamp 810), ties, or the like. Further, it should be appreciated that the hoses or hose kits 812, 814, 816, 818, 820, 822, 824, 826, 828, 832, 836, 838, 840, 842, 844 may be coupled to one another with one or more fittings (e.g., the fittings 830, 834) and/or quick disconnect couplings.

Figure 8B:
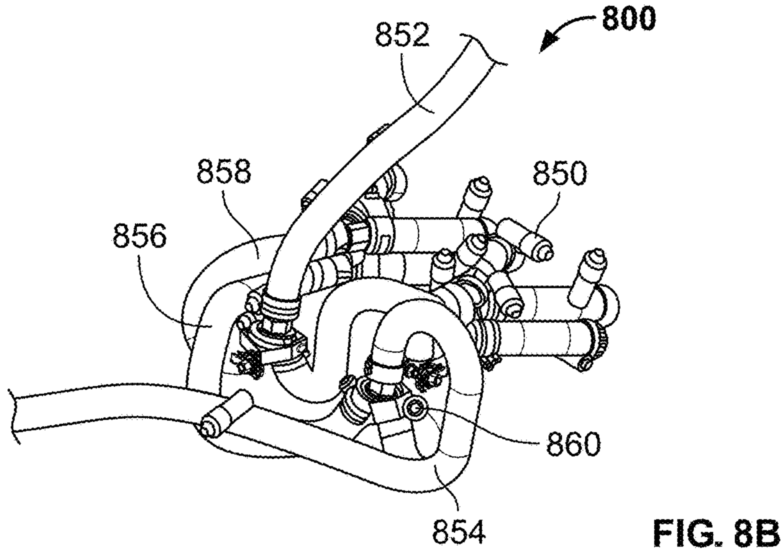
FIG. 8B is a magnified view of one portion of the collection of hoses of FIG. 8A.

Referring now to FIG. 8B, the illustrative network 800 includes a hose clamp 850, a hose 852, a hose 854, a hose 856, a hose 858, and a fitting 860. It should be appreciated that each of the hoses 852, 854, 856, 858 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses 852, 854, 856, 858 may be retained and/or secured with one or more clamps (e.g., the hose clamp 850), ties, or the like. Further, it should be appreciated that the hoses 852, 854, 856, 858 may be coupled to one another with one or more fittings (e.g., the fitting 860) and/or quick disconnect couplings.

Referring now to FIG. 9, the vehicle 200 is illustratively depicted with the multi-segment chassis 210 at least partially unobscured by the floor assembly 220. In the illustrative embodiment, the support arm structures 570, 580 of the midframe assembly 370, the flap 654 and the floor support bar 658 of the sidewall assembly 650 of the power source cradle assembly 350, and the flap 674 and the floor support bar 678 of the sidewall assembly 670 of the power source cradle assembly 350 are arranged in the longitudinal direction LD between the front wheels 212 and the rear wheels 214. The support arm structures 570, 580 are arranged inwardly in the lateral direction LD' relative to the flaps 654, 674. The flaps 654, 674 are arranged at least partially inwardly in the lateral direction LD' relative to the corresponding floor support bars 658, 678. The floor support bar 658 is disposed midway or substantially midway along the length L of the vehicle 200 in the longitudinal direction LD at an outermost lateral side 958 of the chassis 210. The floor support bar 678 is disposed midway or substantially midway along the length L of the vehicle 200 in the longitudinal direction LD at an outermost lateral side 978 of the chassis 210 that is opposite the side 958.

Referring now to FIGS. 10 and 11, the illustrative front suspension subframe assembly 310 includes the base rails 1112, 1114 spaced from one another in the lateral direction LD' and at least one cross rail 1012 extending in the lateral direction LD' to couple the base rails 1112, 1114 to one another. In some embodiments, the subframe assembly 310 includes at least one crossbeam 1014 arranged rearward of the cross rail 1012 in the longitudinal direction LD that extends in the lateral direction LD' to couple the base rails 1112, 1114 to one another. Additionally, in some embodiments, the crossbeam 1014 is coupled to, or otherwise forms a portion of, the base block 530. In some embodiments still, the base rails 1112, 1114, the cross rail(s) 1012, and the crossbeam(s) 1014 cooperate to at least partially define the cage 1010.

In the illustrative embodiment, bumper mount extensions 1120, 1140 of the front suspension subframe assembly 310 are coupled the base rails 1112, 1114, respectively. In some embodiments, the bumper mount extensions 1120, 1140 extend forward of the respective base rails 1112, 1114 in the longitudinal direction LD and are aligned with, or substantially aligned with, the respective base rails 1112, 1114 in the lateral direction LD'. Additionally, in some embodiments, the bumper mount extensions 1120, 1140 are identical to one another or substantially identical to one another.

As best seen in FIG. 11, the mount extension 1120 includes a planar face 1122 and a planar face 1124 interconnected with the planar face 1122. The planar face 1122 is arranged in confronting relation to the front bumper 206. The planar face 1124 is arranged perpendicular to the planar face 1122. A mounting bracket 1106 of the front bumper 206 includes a mounting surface 1108 arranged to interface directly with the planar face 1122 of the mount extension 1120 and a mounting surface 1110 arranged to interface directly with the planar face 1124 of the mount extension 1120 when the mounting bracket 1106 is affixed to the mount extension 1120 and the front bumper 206 is secured to the front suspension subframe assembly 330.

As best seen in FIG. 11, the mount extension 1140 includes a planar face 1142 and a planar face 1144 interconnected with the planar face 1142. The planar face 1142 is arranged in confronting relation to the front bumper 206. The planar face 1144 is arranged perpendicular to the planar face 1142. A mounting bracket 1126 of the front bumper 206 includes a mounting surface 1128 arranged to interface directly with the planar face 1142 of the mount extension 1140 and a mounting surface 1130 arranged to interface directly with the planar face 1144 of the mount extension 1140 when the mounting bracket 1126 is affixed to the mount extension 1140 and the front bumper 206 is secured to the front suspension subframe assembly 330.

In the illustrative embodiment, a mount plate 1150 is directly coupled to the base rail 1112 such that the mount plate 1150 is aligned with the powertrain unit cradle 510 in the longitudinal direction LD. As further discussed below with reference to FIG. 12, the front suspension assembly 320A is configured for mounting to the mount plate 1150 such that the front suspension assembly 320A is arranged outward of the base rail 1112 in the lateral direction LD'. The mount plate 1150 includes a planar exterior face 1152 arranged for direct contact with the front suspension assembly 320A.

In the illustrative embodiment, a mount plate 1160 is directly coupled to the base rail 1114 such that the mount plate 1160 is aligned with the powertrain unit cradle 510 in the longitudinal direction LD. The front suspension assembly 320B is configured to be mounted to the mount plate 1160 such that the front suspension assembly 320B is arranged outward of the base rail 1114 in the lateral direction LD'. The mount plate 1160 includes a planar exterior face 1162 (shown in phantom) arranged for direct contact with the front suspension assembly 320B.

The illustrative cage 1010 includes an upper beam 1170 disposed at the side 1006 of the cage 1010. The upper beam 1170 is aligned with the base rail 1112 in the lateral direction LD' and arranged above the base rail 1112 in the vertical direction VD. In the illustrative embodiment, the upper beam 1170 is spaced from the base rail 1112 in the vertical direction VD to define an opening 1172 between the upper beam 1170 and the base rail 1112. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1172. In the illustrative embodiment, the mount plate 1150 is directly coupled to the upper beam 1170 such that the mount plate 1150 is affixed to each of the base rail 1112 and the upper beam 1170 at the side 1006 of the cage 1010.

The illustrative cage 1010 includes an upper beam 1180 disposed at the side 1008 of the cage 1010. The upper beam 1180 is aligned with the base rail 1114 in the lateral direction LD' and arranged above the base rail 1114 in the vertical direction VD. In the illustrative embodiment, the upper beam 1180 is spaced from the base rail 1114 in the vertical direction VD to define an opening 1182 between the upper beam 1180 and the base rail 1114. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1182. In the illustrative embodiment, the mount plate 1160 is directly coupled to the upper beam 1180 such that the mount plate 1160 is affixed to each of the base rail 1114 and the upper beam 1180 at the side 1008 of the cage 1010.

The illustrative cage 1010 includes a crossbeam 1190 that extends in the lateral direction LD' between the upper beams 1170, 1180 to couple the beams 1170, 1180 to one another. In the illustrative embodiment, the crossbeam 1190 is at least partially received in cutouts 1192, 1194 formed in the upper beams 1170, 1180, respectively. The crossbeam 1190 is arranged at least partially rearward of the mount extensions 1120, 1140 in the longitudinal direction LD. In some embodiments, the crossbeam 1014, the upper beams 1170, 1180, and the crossbeam 1190 cooperate to at least partially enclose an interior space 1196 in which the powertrain unit 360 is positioned.

As best seen in FIG. 11, a steering mechanism 1198 extends across the cage 1010 in the lateral direction LD' and outwardly beyond the sides 1006, 1008 thereof. In the illustrative embodiment, the steering mechanism 1198 includes, or is otherwise embodied as, a steering rack and sway bar assembly. It should be appreciated that in at least some embodiments, the steering mechanism 1198 is coupled to each of the wheels 212 and the corresponding front suspension assemblies 320A, 320B to drive movement (e.g., pivotal movement about an axis extending in the vertical direction VD) of the wheels 212 and the corresponding suspension assemblies 320A, 320B and thereby steer the vehicle 200 in use thereof.

The steering mechanism 1198 is arranged at least partially below the crossbeam 1190 in the vertical direction VD and above the base rail 1112 in the vertical direction VD. In the illustrative embodiment, at least a portion of the steering mechanism 1198 is aligned with, or substantially aligned with, the crossbeam 1190 in the longitudinal direction LD. Additionally, in the illustrative embodiment, the steering mechanism 1198 is arranged at least partially rearward of the mount extensions 1120, 1140 in the longitudinal direction LD.

As shown in FIG. 11, the illustrative vehicle 200 includes a variety of features in addition to the aforementioned devices, assemblies, and/or systems. Those features include, but are not limited to, the following: one or more fasteners 1154; one or more nuts 1156; one or more brake line clips 1158; one or more fasteners 1164 that may be distinguishable from the one or more fasteners 1154; a brake line 1166 for routing to a first braking device (e.g., a braking device adapted to resist rotation of one of the wheels 214); a brake line 1168 for routing to a second braking device (e.g., a braking device adapted to resist rotation of the other of the wheels 214); grommets or grommet mounts 1174 sized to be received in one or more bores 1176 formed in the front bumper 206; and indicators (e.g., turn signals, lights, reflectors, or the like) 1178 adapted to be mounted in the bores 1176 using the grommets 1174.

Figure 12:
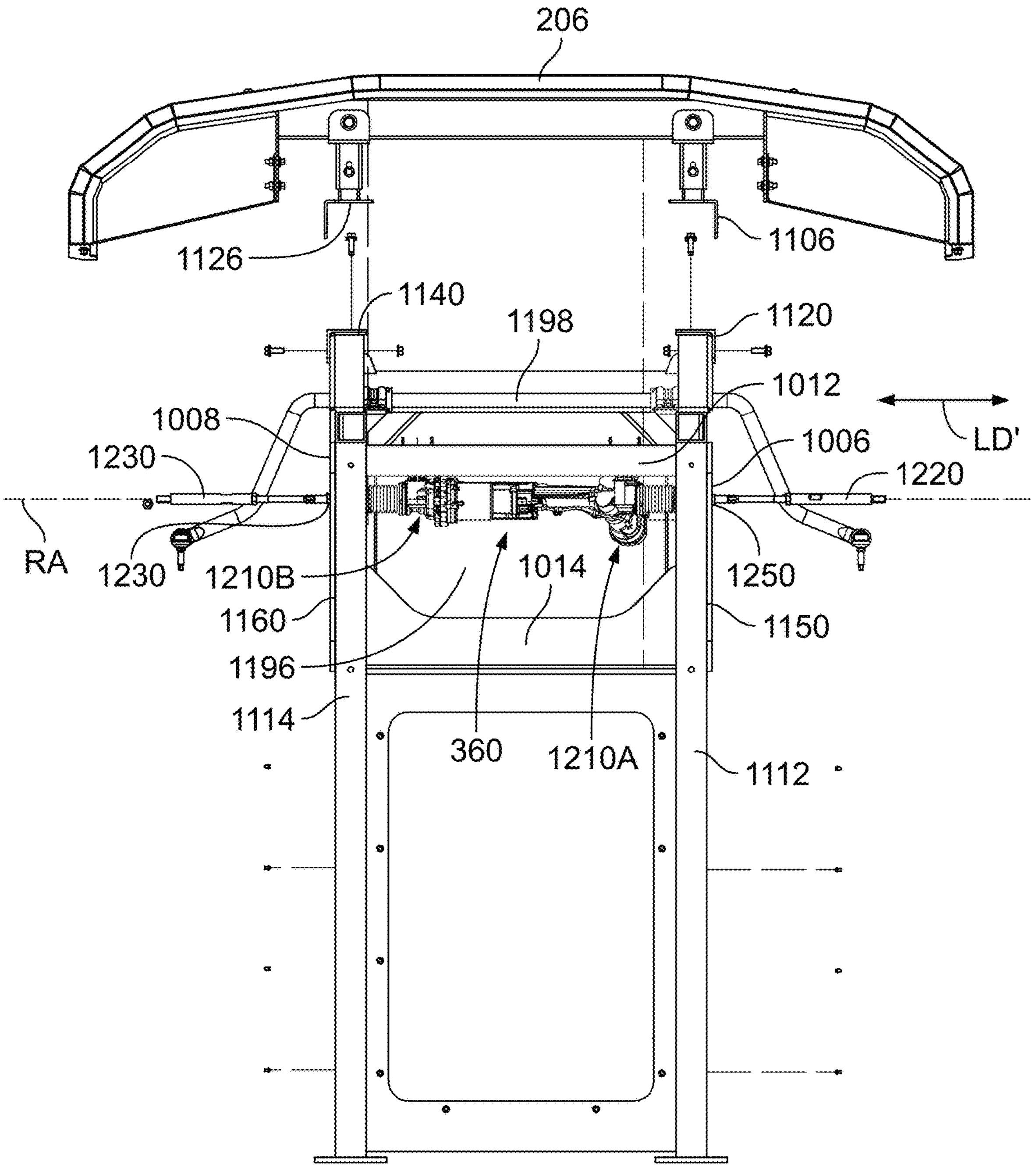
FIG. 12 is a bottom view of the part of the chassis shown in FIG. 10 depicting a front powertrain unit supported by the front suspension subframe assembly.

Referring now to FIG. 12, the mount plate 1150 is directly coupled to the side 1006 of the cage 1010 and the mount plate 1160 is directly coupled to the side 1008 of the cage 1010. The mount plate 1150 includes a cavity 1250 extending therethrough and the mount plate 1160 includes a cavity 1260 extending therethrough. When the powertrain unit 360 is supported by the front suspension subframe assembly 310, the powertrain unit 360 extends through the cavities 1250, 1260 such that the powertrain unit 360 is at least partially surrounded by the mount plates 1150, 1160.

In the illustrative embodiment, the powertrain unit 360 includes at least one drive unit 1210, an axle 1220 coupled to the at least one drive unit 1210, and a wheel hub (not shown in FIG. 12) coupled to the axle 1220 and configured to support a wheel (e.g., one of the front wheels 212) for rotation about a rotational axis RA. The drive unit 1210 includes, or is otherwise embodied as, any device or collection of devices capable of producing rotational power to drive rotation of a wheel supported by the wheel hub through the axle 1220 and the wheel hub. Additionally, in some embodiments, the drive unit 1210, the axle 1220, and the corresponding wheel hub may cooperatively provide, or otherwise establish, a drivetrain for transmitting rotational power generated by the drive unit 1210 to the wheel supported by the wheel hub.

In the illustrative embodiment, the drive unit 1210 includes, or is otherwise embodied as, an electric motor. For example, the drive unit 1210 may include, or otherwise be embodied as, a brushless DC motor, a permanent magnet DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. In other embodiments, the drive unit 1210 may include, or otherwise be embodied as, another suitable electric motor.

In the illustrative embodiment, the axle 1220 extends through the cavity 1250 formed in the mount plate 1150 such that the axle 1220 extends outwardly of the cage 1010 in the lateral direction LD'. As shown in FIGS. 11 and 12, when the axle 1220 extends through the cavity 1250, the axle 1220 is arranged at least partially above the base rail 1112 in the vertical direction VD. Accordingly, due at least to the location of the axle 1220, the powertrain unit 360 is arranged at least partially above the base rail 1112 in the vertical direction VD.

In some embodiments, the at least one drive unit 1210 includes two drive units 1210A, 1210B. In those embodiments, the axle 1220 and the corresponding wheel hub may be coupled to the drive unit 1210A, whereas another axle 1230 of the powertrain unit 360 and another wheel hub coupled to the axle 1230 and configured to support a wheel (e.g., the other of the front wheels 212) for rotation about the rotational axis RA may be coupled to the drive unit 1210B. In those embodiments, the drive unit 1210A, the axle 1220, and the corresponding wheel hub may cooperatively provide, or otherwise establish, a drivetrain for transmitting rotational power generated by the drive unit 1210A to one wheel supported by the wheel hub, and the drive unit 1210B, the axle 1230, and the corresponding wheel hub may cooperatively provide, or otherwise establish, a drivetrain for transmitting rotational power generated by the drive unit 1210B to another wheel supported by the wheel hub.

In some embodiments, each of the drive units 1210A, 1210B includes, or is otherwise embodied as, an electric motor. For example, each of the drive units 1210A, 1210B may include, or otherwise be embodied as, a brushless DC motor, a permanent magnet DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. In other embodiments, each of the drive units 1210A, 1210B may include, or otherwise be embodied as, another suitable electric motor.

In some embodiments, when supported by the front suspension subframe assembly 310, the drive unit 1210A, the axle 1220, the wheel hub coupled to the axle 1220, the drive unit 1210B, the axle 1230, and the wheel hub coupled to the axle 1230 are aligned along the rotational axis RA extending in the lateral direction LD'. Additionally, in some embodiments, the rotational axis RA may define, or otherwise be associated with, a common rotational axis of the pair of front wheels 212 of the vehicle 200.

In some embodiments, the drive units 1210A, 1210B are arranged in the cage 1010 such that the drive units 1210A, 1210B are positioned entirely within the interior space 1196. Consequently, in some embodiments, positioning of the drive units 1210A, 1210B within the interior space 1196 may protect the drive units 1210A, 1210B from forces resulting from impact events at the front bumper 206 or at the sides 1006, 1008 of the cage 1010.

In some embodiments, the drive unit 1210A (e.g., a casing or housing thereof) may be mounted to the cage 1010. In one example, a casing of the drive unit 1210A may be affixed directly to the at least one cross rail 1012 and spaced from the at least one crossbeam 1014 in the longitudinal direction LD. Additionally, in some embodiments, the drive unit 1210B (e.g., a casing or housing thereof) may be mounted to the cage 1010. In one example, a casing of the drive unit 1210B may be affixed directly to the at least one cross rail 1012 and spaced from the at least one crossbeam 1014 in the longitudinal direction LD. In some embodiments still, the drive units 1210A, 1210B may be mounted to the cage 1010 via a common or shared mounting structure, such as a cradle, plate, bracket, clip, or the like.

In some embodiments, upon detachment of a common or shared mounting structure by which the powertrain unit 360 is secured to the front suspension subframe assembly 310, the drive unit 1210A, the axle 1220, the wheel hub coupled to the axle 1220, the drive unit 1210B, the axle 1230, and the wheel hub coupled to the axle 1230 may be detached from the front suspension subframe assembly 310 as a single unit. Accordingly, in some embodiments, the powertrain unit 360 may be easily detachable from the front suspension subframe assembly 310 to facilitate access to those components for maintenance, servicing, repair, and/or replacement.

It should be appreciated that in some embodiments, the powertrain unit 360 may include components in addition to those mentioned above. Such components may include, but are not limited to, bearings, seals, gaskets, rods, brackets, shafts, rings, spacers, cams, gears, spindles, spokes, teeth, flanges, blocks, belts, pulleys, drums, or the like. Additional components of the powertrain unit 360 may be selected and/or employed to permit translation and/or rotation of powertrain components, or to resist translation and/or rotation of those components, as the case may be.

In some embodiments, the powertrain unit 360 may include one transmission (not shown) coupled between the drive unit 1210A and the axle 1220 and another transmission (not shown) coupled between the drive unit 1210B and the axle 1230. In other embodiments, however, the transmissions may be omitted from the powertrain unit 360.

Figure 14:
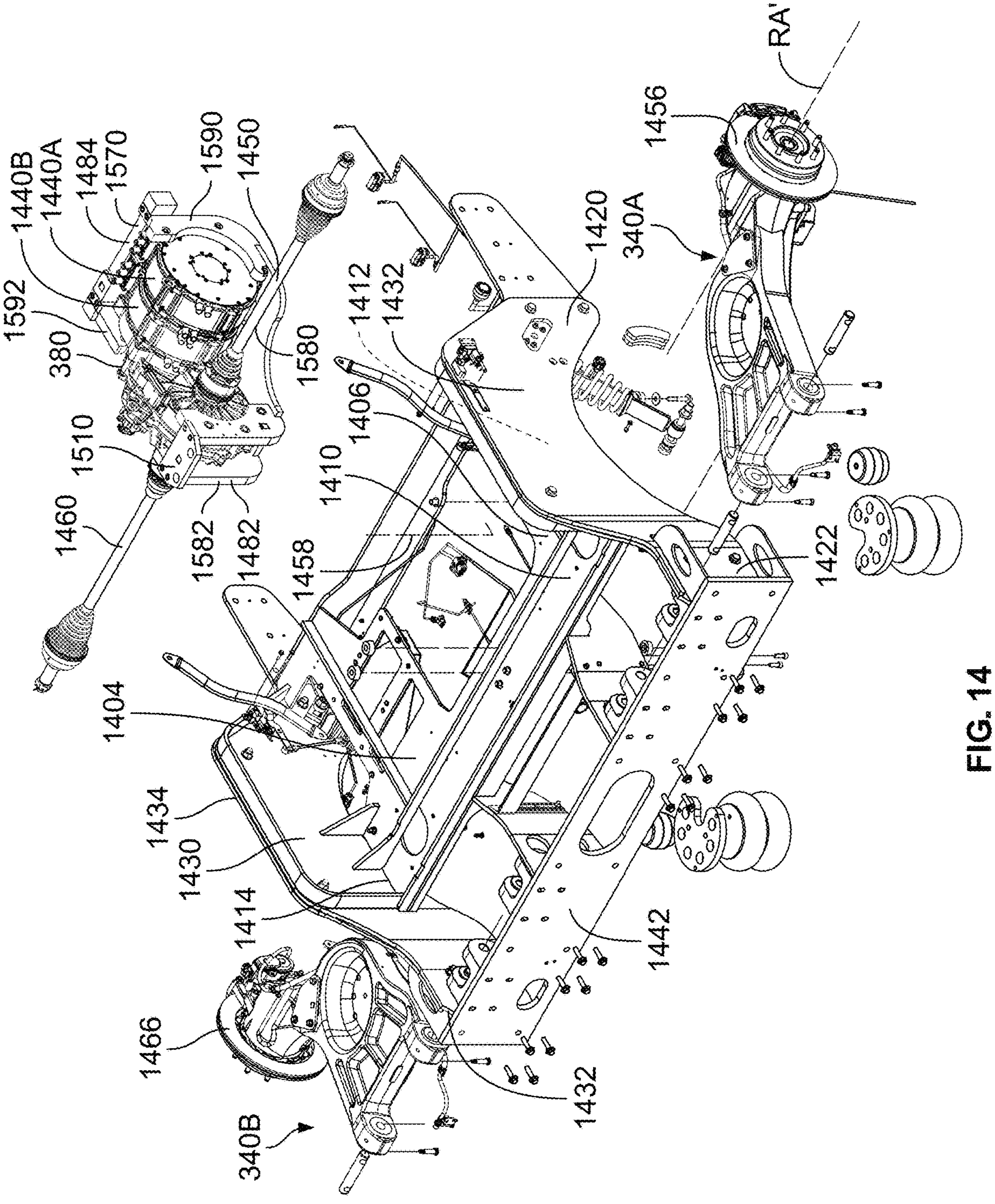
FIG. 14 is a partially exploded perspective view of the part of the chassis shown in FIG. 13 showing the rear suspension subframe assembly, the pair of rear suspension assemblies, and a rear powertrain unit of the vehicle.

Referring now to FIGS. 13 and 14, the rear suspension subframe assembly 330 is illustrated as supporting the rear suspension assemblies 340A, 340B and the powertrain unit

380 (see FIG. 13) and with the rear suspension assemblies 340A, 340B and the powertrain unit 380 exploded therefrom (see FIG. 14). In the illustrative embodiment, a swing arm assembly 1310 of the rear suspension assembly 340A is pivotally coupled to the rear suspension subframe assembly 330 via hinge joints 1302, 1304. Additionally, in the illustrative embodiment, a swing arm assembly 1312 of the rear suspension assembly 340B is pivotally coupled to the rear suspension subframe assembly 330 via hinge joints 1306, 1308.

As shown in FIG. 14, in the illustrative embodiment, the powertrain unit 380 includes two drive units 1440A, 1440B. In some embodiments, the drive units 1440A, 1440B are identical or substantially similar to the drive units 1210A, 1210B. In any case, the drive unit 1440A is coupled to an axle 1450 of the powertrain unit 380, and the axle 1450 is coupled to a wheel hub 1456 configured to support a wheel (e.g., one of the rear wheels 214) for rotation about a rotational axis RA'. In some embodiments, the wheel hub 1456 may be integrally formed with the swing arm assembly 1310. The drive unit 1440B is coupled to an axle 1460 of the powertrain unit 380, and the axle 1460 is coupled to a wheel hub 1466 configured to support a wheel (e.g., the other of the rear wheels 214) for rotation about the rotational axis RA'. In some embodiments, the wheel hub 1466 may be integrally formed with the swing arm assembly 1312.

It should be appreciated that in some embodiments, the powertrain unit 380 may include components in addition to those mentioned above. Such components may include, but are not limited to, bearings, seals, gaskets, rods, brackets, shafts, rings, spacers, cams, gears, spindles, spokes, teeth, flanges, blocks, belts, pulleys, drums, or the like. Additional components of the powertrain unit 380 may be selected and/or employed to permit translation and/or rotation of powertrain components, or to resist translation and/or rotation of those components, as the case may be.

Each of the illustrative drive units 1440A, 1440B includes, or is otherwise embodied as, any device or collection of devices capable of producing rotational power to drive rotation of wheels (e.g., the rear wheels 214) supported by the wheel hubs 1456, 1466 through respective axles 1450, 1460. In the illustrative embodiment, each of the drive units 1440A, 1440B includes, or is otherwise embodied as, an electric motor. For example, each of the drive units 1440A, 1440B may include, or otherwise be embodied as, a brushless DC motor, a permanent magnet DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. In other embodiments, each of the drive units 1440A, 1440B may include, or otherwise be embodied as, another suitable electric motor.

In the illustrative embodiment, when supported by the rear suspension subframe assembly 330, the axle 1450, the wheel hub 1456, the axle 1460, and the wheel hub 1466 are aligned along the rotational axis RA' extending in the lateral direction LD'. Additionally, in some embodiments, the rotational axis RA' may define, or otherwise be associated with, a common rotational axis of the pair of front wheels 214 of the vehicle 200.

In the illustrative embodiment, as shown in FIGS. 13 and 14, the powertrain unit 380 is at least partially positioned in the central cavity 710 formed in the base plate 1410 of the rear suspension subframe assembly 330. When the powertrain unit 380 is positioned in the central cavity 710, the powertrain unit 380 is at least partially arranged beneath the frame arches 1420, 1430 in the vertical direction VD without being surrounded by the frame arches 1420, 1430. More specifically, when the powertrain unit 380 is positioned in the central cavity 710, the axle 1450 and the wheel hub 1456 are arranged beneath the frame arch 1420 in the vertical direction VD and the axle 1460 and the wheel hub 1466 are arranged beneath the frame arch 1430 in the vertical direction VD.

Figure 15:
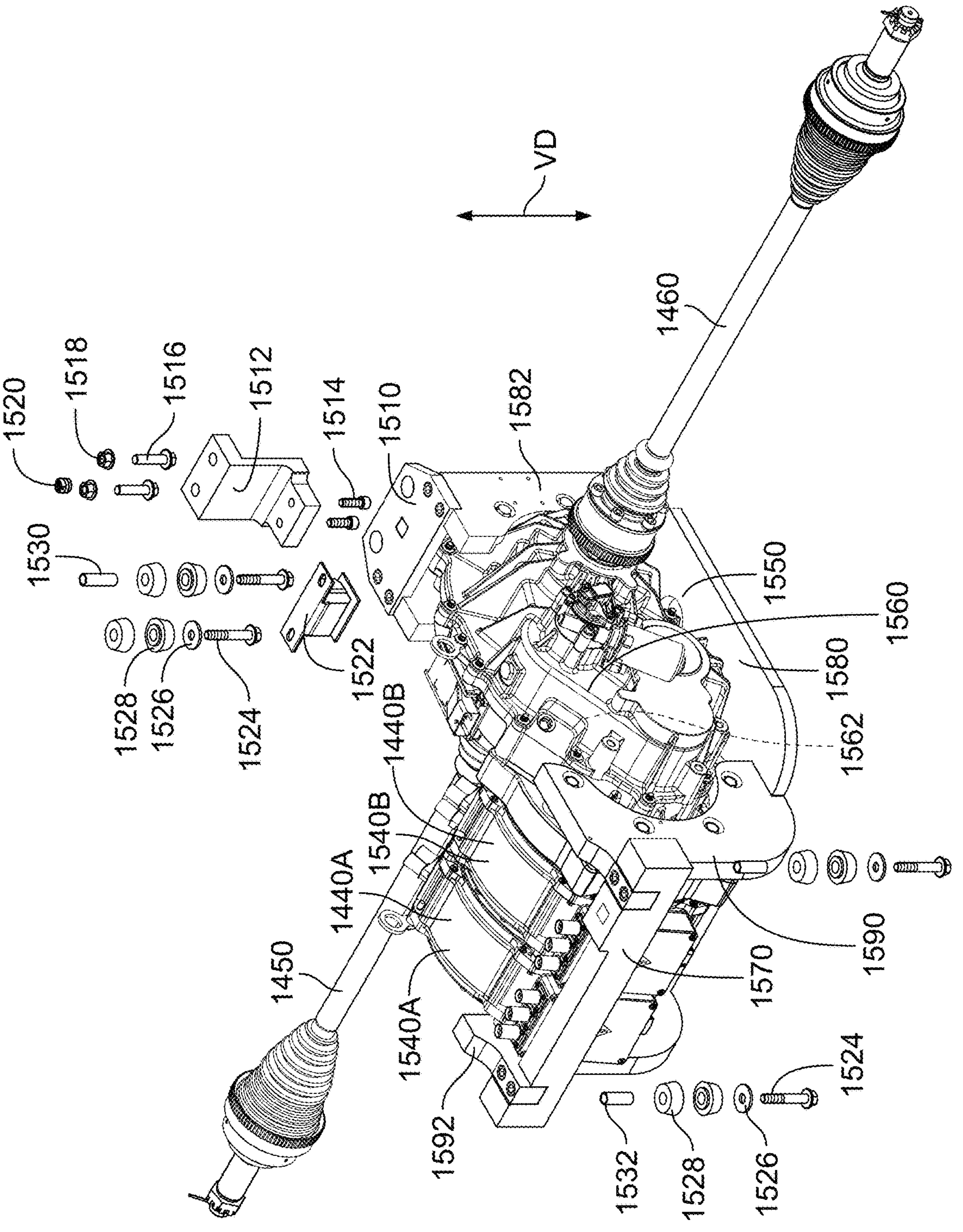
FIG. 15 is a perspective view of the rear powertrain unit shown in FIG. 14 with the rear suspension subframe assembly and the pair of rear suspension assemblies omitted for the sake of clarity.

Referring now to FIG. 15, in the illustrative embodiment, the drive units 1440A, 1440B are housed by respective housings 1540A, 1540B. The respective housings 1540A, 1540B are coupled to and supported by a main case 1550 of the powertrain unit 380. In some embodiments, the main case 1550 includes a case extension 1560 coupled to the axles 1450, 1460. Additionally, in some embodiments, the case extension 1560 houses a transmission 1562 (shown in phantom) coupled between one or more of the drive units 1440A, 1440B and the axles 1450, 1460. In other embodiments, however, the transmission 1562 may be omitted.

In any case, the main case 1550 is affixed to the rear suspension subframe assembly 330 to secure the powertrain unit 380 in place when the powertrain unit 380 is positioned in the central cavity 710. Additionally, as best seen in FIG. 14, when the main case 1550 is affixed to the rear suspension subframe assembly 330, the drive units 1440A, 1440B are spaced in the longitudinal direction LD from the rotational axis RA' along which the axles 1450, 1460 extend such that the drive units 1440A, 1440B are located rearward of the corresponding axles 1450, 1460 in the longitudinal direction LD. That is, the drive units 1440A, 1440B are longitudinally spaced or offset from the rotational axis RA' when the main case 1550 is affixed to the rear suspension subframe assembly 330.

As best seen in FIG. 15, in the illustrative embodiment, the main case 1550 includes a mount plate 1510 configured for mounting the main case 1550 to the base plate 1410 using a mount bracket 1512. In such embodiments, the mount bracket 1512 may be affixed to the mount plate 1510 using fasteners 1514, and the mount bracket 1512 may be attached to the base plate 1410 using fasteners 1516, nuts 1518, and one or more insert(s) 1520. In some embodiments, the main case 1550 and/or the case extension 1560 may be mounted to the rear suspension subframe assembly 330 (e.g., the base plate 1410) using a mount 1522, fasteners 1524, washers 1526, isolator pads 1528, and spacers 1530.

In the illustrative embodiment, the main case 1550 includes a mount bar 1570 configured for mounting the main case 1550 to a rear support bar 1458 that is coupled to, and extends across, extension arms 1404, 1406 of the base plate 1410 in the lateral direction LD' to at least partially close the central cavity 710. In some embodiments, the mount bar 1570 may be mounted to the rear support bar 1458 using the fasteners 1524, the washers 1526, the isolator pads 1528, and spacers 1532.

In the illustrative embodiment, the main case 1550 includes a base block 1580 defining a lowermost section of the main case 1550 in the vertical direction VD. The base block 1580 includes, or is otherwise coupled to, an axle support extension 1582 disposed in close proximity to the axles 1450, 1460 that is coupled to the mount plate 1510. In the installation orientation depicted in FIG. 14, the axle support extension 1582 and the mount plate 1510 cooperate to define a forward end 1482 of the powertrain unit 380 in the longitudinal direction LD. In some embodiments, the axle support extension 1582 may support the axles 1450, 1460 for rotation about the rotational axis RA' and secure the axles 1450, 1460 against movement in the longitudinal direction LD and/or the lateral direction LD'.

In the illustrative embodiment, the main case 1550 includes a pair of U-shaped cradles 1590, 1592 coupled to and/or interconnected with the base block 1580. The cradles 1590, 1592 are spaced from one another in the lateral direction LD' and coupled to the housings 1540A, 1540B of the drive units 1440A, 1440B. In some embodiments, at least one of the cradles 1590, 1592 extends circumferentially at least partway around at least one of the housings 1540A, 1540B. In those embodiments, at least one of the cradles 1590, 1592 secures at least one of the drive units 1440A, 1440B against movement in the longitudinal direction LD and/or the lateral direction LD'. The cradles 1590, 1592 are affixed to the mount bar 1570 as best seen in FIG. 15. In the installation orientation depicted in FIG. 14, the cradles 1590, 1592 and the mount bar 1570 cooperate to define a rear end 1484 of the powertrain unit 380 in the longitudinal direction LD arranged opposite the forward end 1482.

Referring now to FIG. 16, in the illustrative embodiment, the base block 1580 of the main case 1550 is arranged midway or substantially midway in the lateral direction LD' between the rear suspension assemblies 340A, 340B. A cover 1610 is arranged between a shock absorber 1670 of the rear suspension assembly 340A and the base block 1580 in the lateral direction LD'. In the illustrative embodiment, the cover 1610 is coupled to a strain relief plate 1620 that is arranged above the cover 1610 in the vertical direction VD such that the strain relief plate 1620 is at least partially covered by the cover 1610. A cover 1630 is arranged between a shock absorber 1672 of the rear suspension assembly 340B and the base block 1580 in the lateral direction LD'. In some embodiments, the cover 1630 may be coupled to the strain relief plate 1620 such that the strain relief plate 1620 is at least partially covered by the cover 1630.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:

a chassis extending in a longitudinal direction;

a plurality of wheels supported by the chassis; and a first powertrain unit supported by the chassis and coupled to a pair of front wheels of the plurality of wheels, wherein the first powertrain unit extends in a lateral direction perpendicular to the longitudinal direction through opposites sides of a cage of the chassis and through a pair of mount plates coupled to the cage opposite one another.

2. The electric vehicle of claim 1, wherein the pair of mount plates are coupled to exterior sides of the cage.

3. The electric vehicle of claim 1, wherein the first powertrain unit includes at least one electric motor.

4. The electric vehicle of claim 3, wherein the at least one electric motor comprises a pair of electric motors.

5. The electric vehicle of claim 4, wherein the pair of electric motors are positioned entirely in an interior space defined by the cage.

6. The electric vehicle of claim 1, wherein:

the chassis comprises a base rail assembly including a pair of base rails spaced from one another in the lateral direction, and the cage is mounted to the base rail assembly.

7. The electric vehicle of claim 6, wherein the first powertrain unit is arranged at least partially above the pair of base rails in a vertical direction.

8. The electric vehicle of claim 6, wherein:

the base rail assembly includes at least one cross rail extending in the lateral direction to couple the pair of base rails to one another, and the first powertrain unit is mounted to the at least one cross rail.

9. The electric vehicle of claim 6, wherein:

the base rail assembly includes at least one cross rail extending in the lateral direction to couple the pair of base rails to one another, the first powertrain unit includes a pair of electric motors, and each electric motor is mounted to the at least one cross rail.

10. The electric vehicle of claim 1, wherein:

the first powertrain unit includes at least one electric motor, and the at least one electric motor is positioned entirely in an interior space defined by the cage.

* * * * *